US012570484B1

(12) United States Patent
Baker et al.

(10) Patent No.: US 12,570,484 B1
(45) Date of Patent: Mar. 10, 2026

(54) MAGNETIC MOVEMENT USING OFFSET MAGNETIC ARRAYS WITH ELECTROMAGNETS

(71) Applicant: US Positronix Inc., Oberlin, OH (US)

(72) Inventors: John M. Baker, Hayward, CA (US);
Remigio Perales, Oberlin, OH (US)

(73) Assignee: US Positronix Inc., Oberlin, OH (US)

( * ) Notice: Subject to any disclaimer, the term of this patent is extended or adjusted under 35 U.S.C. 154(b) by 206 days.

(21) Appl. No.: 18/436,922

(22) Filed: Feb. 8, 2024

Related U.S. Application Data

(60) Provisional application No. 63/483,758, filed on Feb. 8, 2023.

(51) Int. Cl.
| | |
|---|---|
| *B65G 54/02* | (2006.01) |
| *B65G 43/00* | (2006.01) |
| *H01F 6/04* | (2006.01) |
| *H01F 7/06* | (2006.01) |
| *H02K 41/02* | (2006.01) |
| *H02K 41/03* | (2006.01) |
| *H02N 15/00* | (2006.01) |

(52) U.S. Cl.
CPC ............. *B65G 54/02* (2013.01); *B65G 43/00* (2013.01); *H01F 6/04* (2013.01); *H01F 7/066* (2013.01); *H02K 41/02* (2013.01); *H02K 41/033* (2013.01); *H02N 15/00* (2013.01); *B65G 2812/99* (2013.01); *H01F 2007/068* (2013.01)

(58) Field of Classification Search
CPC ........... B65G 54/02; B65G 43/00; H01F 6/04; H01F 7/066; H02N 15/00; H02K 41/033; H02K 41/031; H02K 41/02

USPC .......................................................... 198/805
See application file for complete search history.

(56) References Cited

U.S. PATENT DOCUMENTS

| | | | |
|---|---|---|---|
| 2015/0097498 A1* | 4/2015 | Hemati ................ | H02K 41/031 |
| | | | 318/135 |
| 2018/0210001 A1* | 7/2018 | Reza ......................... | B01L 9/06 |
| 2019/0097515 A1* | 3/2019 | Ota ......................... | B65G 54/02 |
| 2024/0329071 A1* | 10/2024 | Narayana .............. | B65G 54/02 |

FOREIGN PATENT DOCUMENTS

WO      WO-2018208658 A1 * 11/2018 ............... G01G 7/02

* cited by examiner

*Primary Examiner* — James R Bidwell
(74) *Attorney, Agent, or Firm* — Thomas E. Lees, LLC

(57) ABSTRACT

A system provides a work surface, a configuration space unit, and a magnetic movement system. The work surface has a configuration space associated therewith. In this regard, the configuration space unit is positionable within the associated configuration space of the work surface. The magnetic movement system has unit cells arranged in cooperation with the work surface, where each unit cell comprises an actuator, a magnet coupled to the actuator such that the actuator causes movement of the magnet defining an actuated magnet, and an electromagnetic coil. Moreover, the magnetic movement system is configured such that a magnetic field produced by at least one unit cell performs at least one operation that affects a position of the configuration space unit within the configuration space of the work surface.

25 Claims, 15 Drawing Sheets

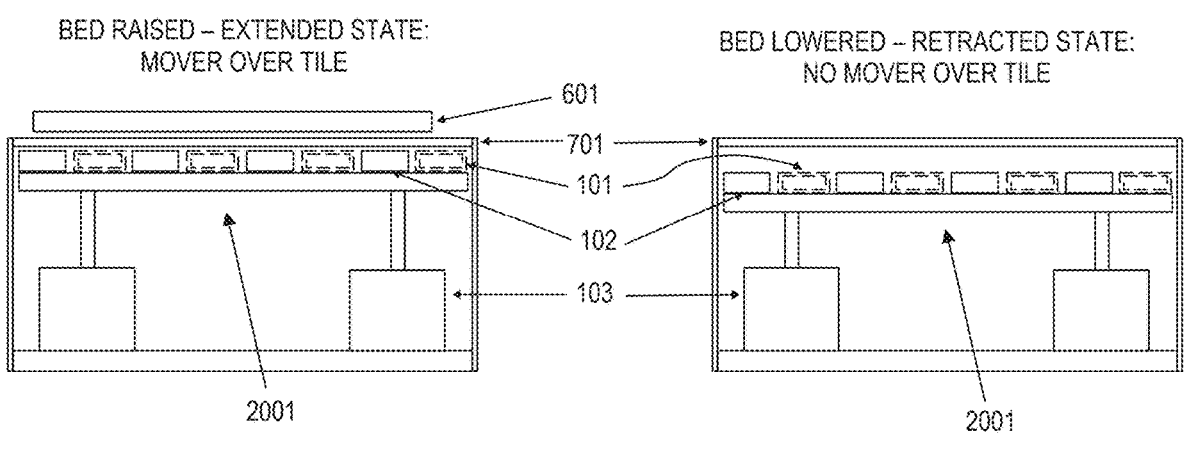
FIG. 20A                              FIG. 20B
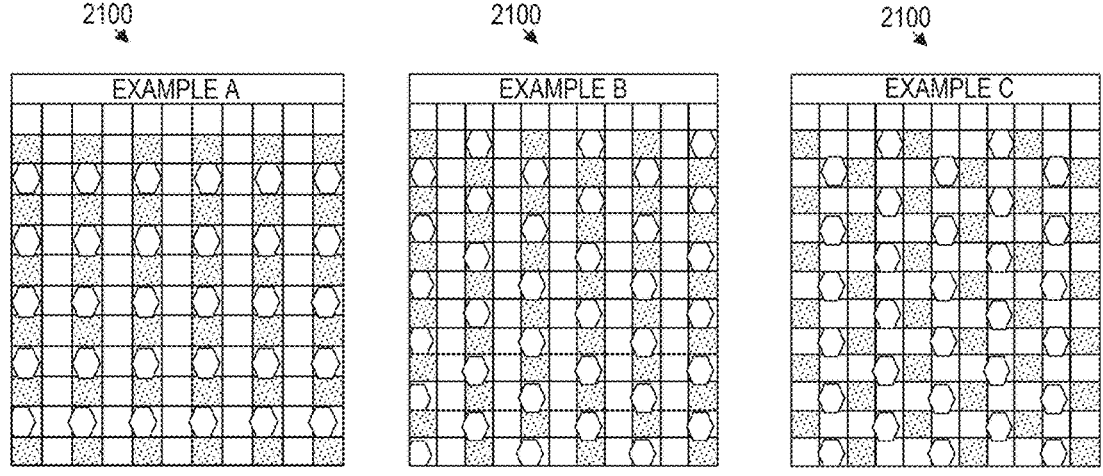
FIG. 21A                    FIG. 21B                    FIG. 21C

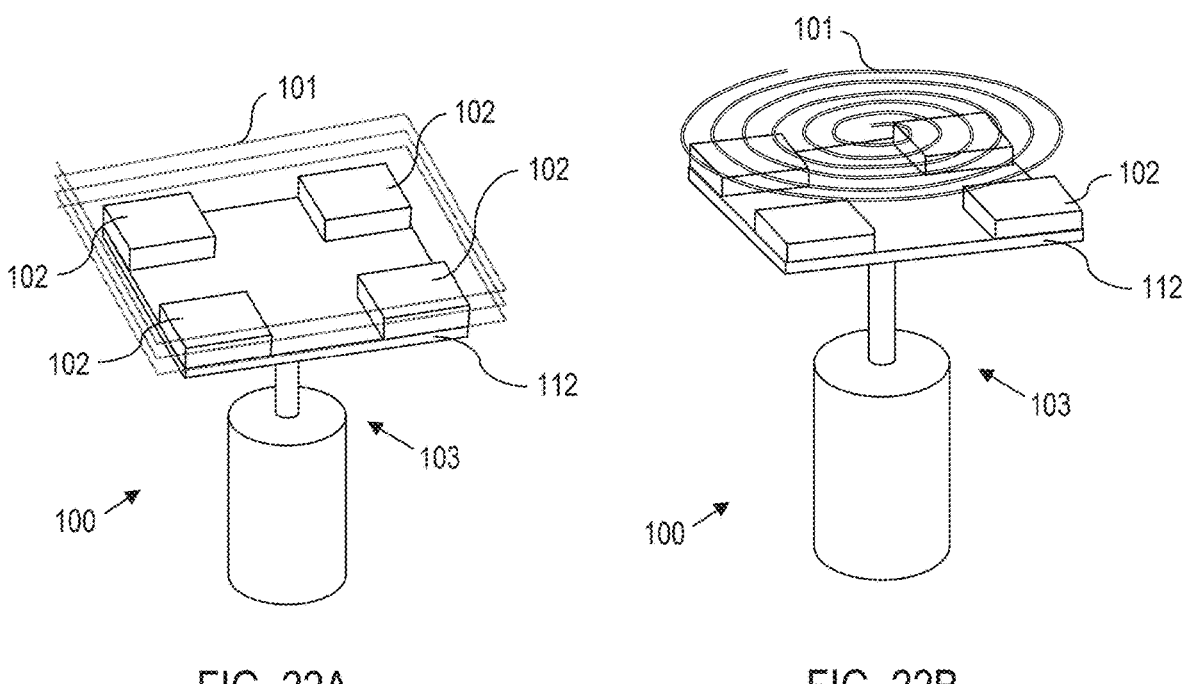
FIG. 22A
FIG. 22B
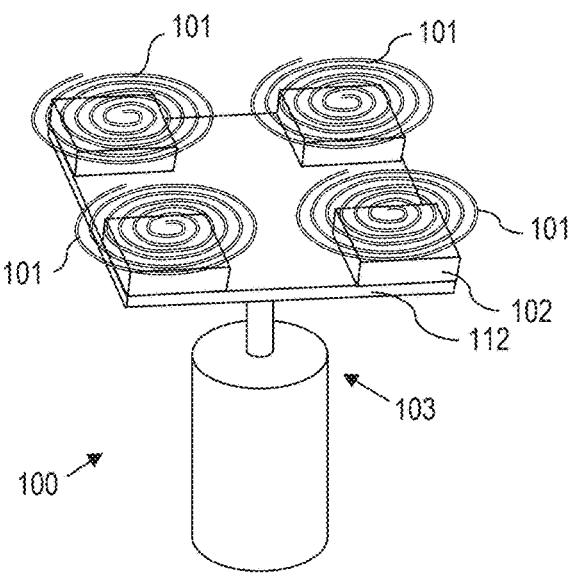
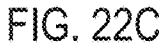
FIG. 22C
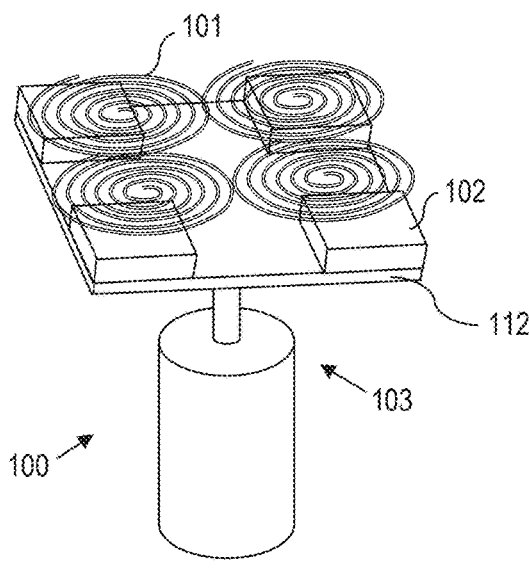
FIG. 22D

MAGNETIC MOVEMENT USING OFFSET MAGNETIC ARRAYS WITH ELECTROMAGNETS

CROSS REFERENCE TO RELATED APPLICATIONS

This application claims the benefit of U.S. Provisional Patent Application Ser. No. 63/483,758, filed Feb. 8, 2023, having the title "MAGNETIC LEVITATION AND MOVEMENT USING OFFSET MAGNETIC ARRAYS WITH ELECTROMAGNETS", the disclosure of which is hereby incorporated by reference in its entirety.

BACKGROUND

Magnetic levitation and movement systems exist that can lift, stabilize and move heavy loads. However, such systems require large amounts of power to perform these tasks. Moreover, such systems generate significant amounts of heat, which result in inefficiencies and excessive wear on the movement system hardware. Systems that levitate objects as heavy as trains also require physical constraints, such as rails to achieve stability and keep the levitated objects in a proper position in relation to the magnets causing levitation.

BRIEF SUMMARY

According to aspects herein, a system comprises a work surface, a configuration space unit, and a magnetic movement system. The work surface has a configuration space associated therewith. In this regard, the configuration space unit is positionable within the associated configuration space of the work surface. The magnetic movement system has unit cells arranged in cooperation with the work surface, where each unit cell comprises an actuator, a magnet coupled to the actuator such that the actuator causes movement of the magnet defining an actuated magnet, and an electromagnetic coil. Moreover, the magnetic movement system is configured such that a magnetic field produced by at least one unit cell performs at least one operation that affects a position of the configuration space unit within the configuration space of the work surface.

In some implementations, a controller is operatively programmed to control the unit cells of the magnetic movement system to perform the at least one operation to levitate, tilt, spin/orient, move, propel, thrust, pull, push, or combinations thereof, the configuration space unit relative to the work surface. In this implementation, the controller can be programmed to carry out each operation based issuing commands to at least one unit cell to selectively control the actuator to adjust a position of the actuated magnet relative to the work surface, selectively communicate a signal to the electromagnetic coil to control a field generated thereby, or selectively control both the actuator and the communicated signal to the electromagnetic coil.

Moreover, in some implementations, each unit cell of the magnetic movement system can further comprise a sensor node that is configured to measure at least one kinematical aspect of the configuration space unit. In this implementation, the controller can be further operatively programmed to collect measurements from at least one sensor node, detect an instability of the configuration space unit based at least in part, from the collected measurements, and provide a command to the magnetic movement system to output a time-varying magnetic field which reacts to the detected instability based upon the collected measurements to provide a magnetic field which counters the instability.

According to further aspects herein, a system comprises a configuration space unit, a magnetic movement system, and a controller. The magnetic movement system is configured to perform at least one operation to levitate, tilt, spin/orient, move, propel, thrust, pull, or push the configuration space unit. In this regard, the magnetic movement system has unit cells, where each unit cell comprises an actuator, a magnet coupled to the actuator such that the actuator causes movement of the magnet, and an electromagnetic coil. The controller is operatively programmed to control the unit cells of the magnetic movement system to perform the at least one operation. More particularly, the controller is programmed to carry out each operation based issuing commands to at least one unit cell to selectively control the actuator to adjust a position of the actuated magnet relative to the work surface, selectively communicate a signal to the electromagnetic coil to control a field generated thereby, or selectively control both the actuator and the communicated signal to the electromagnetic coil.

According to yet further aspects herein, a system comprises a configuration space unit, a magnetic movement system, and a controller. The configuration space unit has a magnet and a conveyance system (e.g., at least one of casters, rollers, wheels, bearings, etc.) on a bottom thereof. The magnetic movement system is configured to utilize magnetic forces in cooperation with the magnet on the bottom of the configuration space unit to move the configuration space unit across a work surface. In this regard, the magnetic movement system has unit cells that cooperate with the work surface. Each unit cell comprises at least one of an actuator and a permanent magnet coupled to the actuator such that the actuator causes movement of the permanent magnet, and an electromagnetic coil. The controller that is communicably coupled to unit cells. Moreover, the controller is operatively programmed to control select unit cells to carry out the movement of the configuration space unit across the work surface.

BRIEF DESCRIPTION OF THE SEVERAL VIEWS OF THE DRAWINGS

FIG. 20A-FIG. 20B illustrate a pair of side views of a module of permanent magnets and electromagnets under a false floor, where the entire module can be raised and lowered with linear actuators to be closer to or farther away from a configuration space unit above.

FIG. 21A-FIG. 21C illustrate a group of three top views of example array arrangements of permanent magnets and electromagnets.

FIG. 22A illustrates an example unit cell having multiple permanent magnets arranged on a plate, and a single electromagnetic coil.

FIG. 22B illustrates another example unit cell having multiple permanent magnets arranged on a plate and a single electromagnetic coil implemented using a PCB for the coil.

FIG. 22C illustrates yet another example unit cell having multiple permanent magnets arranged on a plate and a corresponding number of electromagnetic coils, each coil aligned with a corresponding permanent magnet.

FIG. 22D illustrates still another example unit cell having multiple permanent magnets arranged on a plate and a corresponding number of electromagnetic coils, each coil offset from a corresponding permanent magnet.

DETAILED DESCRIPTION

Figures 1A, 1B, 1C:
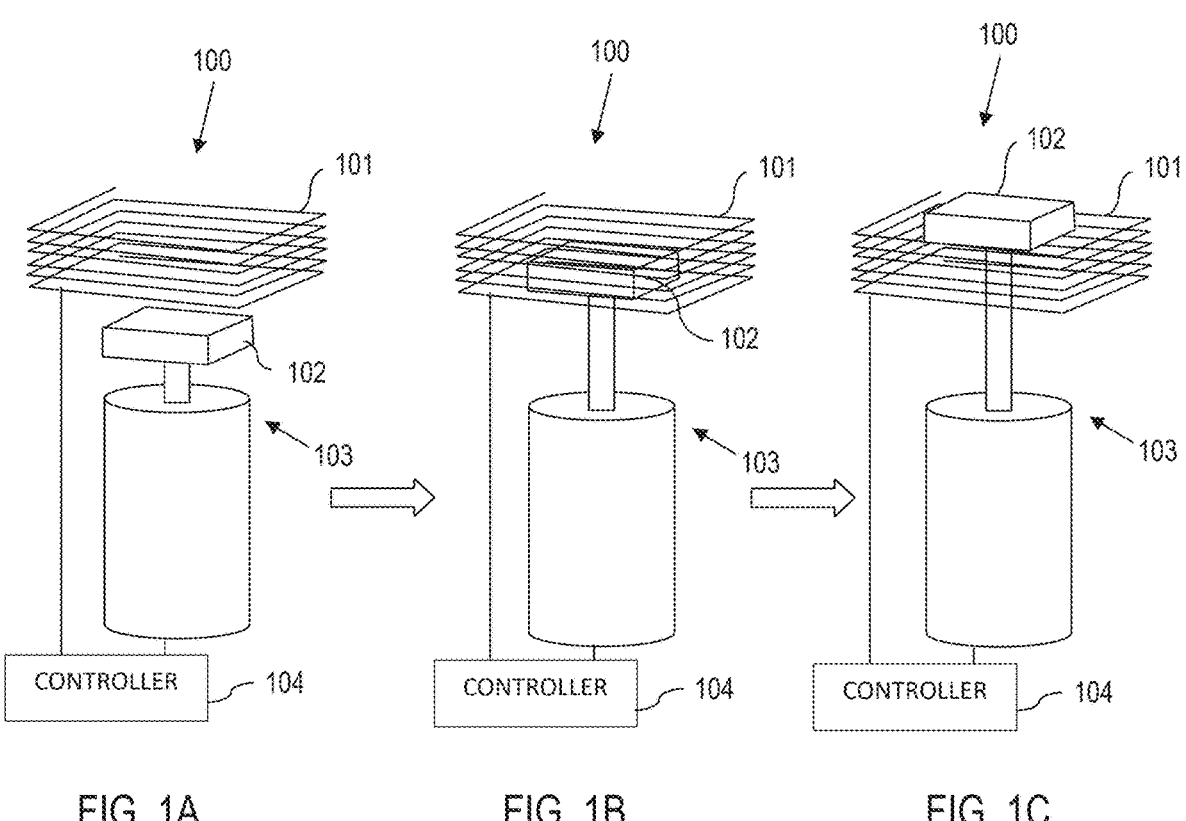
FIG. 1A illustrates a first isometric side view of an actuated magnet with a co-located wire coil, with the actuated magnet in a fully retracted position.
FIG. 1B illustrates a second isometric side view of the actuated magnet with a co-located wire coil of FIG. 1A, with the actuated magnet in a partially extended position.
FIG. 1C illustrates a third isometric side view of the actuated magnet with a co-located wire coil of FIG. 1A, with the actuated magnet in a fully extended position.

Aspects herein provide a magnetic movement system that can lift, stabilize, move, orient, or otherwise position objects, including very heavy objects. Moreover, such magnetic movement systems can operate with a manageable amount of power and heat, and do not require rails or other physical restraints.

INTRODUCTION

Aspects herein disclose a system in which magnets provide magnetic forces that operate on a configuration space unit positioned relative to a work surface. For instance, where the work surface is a horizontal bed, the magnetic forces operate on a configuration space unit positioned above the horizontal bed to affect a position of the configuration space unit, e.g., to spin, orient, tilt, stabilize, move, thrust, pull, push, lift, levitate, etc., the configuration space unit. Moreover, aspects of the disclosure expand on such magnetic movement systems and provide alternatives and improvements.

In this regard, aspects herein define a configuration space. As used herein, the configuration space includes a space associated with the work surface to which a controller can control a magnetic movement system to perform work, e.g., to sense, identify, locate, position, or otherwise interact with an object (i.e., a configuration space unit) in the configuration space. In this regard, a configuration space can comprise an area, volume, regular volume, irregular volume, etc.

As used herein, a configuration space unit (CSU or CSUs-plural) is an object positionable within a configuration space of a work surface that can be manipulated by a corresponding magnetic movement system as described more fully herein. By way of non-limiting example, a configuration space unit can comprise a mobility unit (an object that can move or is otherwise movable), such as a mover, cart, sled, moveable pallet or platform, automatic guided vehicle, operator-assisted vehicle, pedestrian (e.g., via an object worn, carried or otherwise attached to the pedestrian), etc. A configuration space unit can also comprise an object that is fixedly positioned relative to the configuration space, which may have components capable of limited movement, such as a stationary robot with a moveable end effector, a machine, etc.

Moreover, as used herein, the term "levitate" and derivatives thereof (e.g., levitates, levitating, levitation, etc.) means to provide a force that acts on an object, such as a configuration space unit. For instance, an example force can comprise a magnetic force that opposes the effect of gravity. By way of illustration, in the example case of a configuration space unit such as a mover, levitation may comprise lifting the mover from a work surface so as to rise into the air sufficient to avoid physical contact with the work surface. As another example, the levitation force may be insufficient to physically cause the configuration space unit to lift completely from the work surface, but the levitation force opposes gravity sufficient to reduce friction when moving or orienting a configuration space unit. As an example, a configuration space unit such as a cart may not physically lift off the work surface. However, the magnetic movement system applies a sufficient force acting on the configuration space unit to assist overcoming static friction, to assist the cart in rolling along the work surface, to help brake a rolling cart, etc. Levitation can also include tilting, or otherwise imparting a lifting force, whether the lifting force is sufficient to overcome the weight of the object/gravity.

In order to levitate a system of magnets, a magnetic control system must provide two essential elements 1) a force, to overcome the attractive force of gravity (e.g., to lift (Z direction), to pull and/or push (e.g., in any combination of X, Y, and Z directions, etc.), and 2) stability. Magnetic levitation where an object rises completely off a surface is inherently unstable according to Earnshaw's theorem, and therefore a static arrangement of permanent magnets generally cannot be used for stable levitation.

Instead, levitation control systems herein are configured to provide a time-varying magnetic field which reacts to any instability and provides a magnetic field which counters the instability. This can be implemented, for example, using an active feedback scheme in which some kinematical aspect of the magnets are measured (e.g. position, velocity and acceleration). If the sensed position, for example, is determined to be drifting from its desired position, then countering forces are applied to the magnets. The determination of the position, velocity etc., can be accomplished using any variety of sensors (e.g., optical, hall effect, etc.). Moreover, in the case of actuated permanent magnets, the countering forces can be affected by physically moving the actuated magnets in response to the readings of the various sensors.

In addition to lift and stability, if motion of the magnets is desired, then the levitation control system can also be adapted to provide forces/torques to the magnets while maintaining stability. According to aspects herein, for full control of a array of magnets, the control system may be able to provide control in six separate degrees of freedom. The six degrees of freedom implementation requires the control system to provide forces, for example, in the X, Y and Z directions as well as torques about the X, Y and Z axes. It should be noted that the same system that provides stability may also provide lateral forces, e.g., to attract and/or repel configuration space unit magnets to spin/orient, move, propel, thrust, pull, push (or any combination thereof) a configuration space unit.

Aspects herein provide a movement system that creates repulsive and/or attractive magnetic forces by lifting and lowering magnets (referred to herein as "actuated magnets") from a bed of such magnets, e.g., which may be arranged in unit cells, as will be described more fully herein. Moreover, aspects herein provide details for enabling the incorporation of electromagnets with the actuated permanent magnets in a bed of magnets. In an example implementation, a wire coil of an electromagnet is co-located with each actuated magnet. In some implementations, each actuated magnet travels up and optionally through, its associated wire coil. In another implementation, each actuated magnet is paired with an electromagnet having a coil, e.g., which can be printed on a PCB (printed circuit board), and each PCB coil can be located above the highest level of its associated actuated magnet. The electromagnetic coils can be cooled to enable superconductivity.

The actuated magnets and electromagnets can be configured to work together in various relationships and geometries. In an example implementation, the actuated permanent magnets are used to support loads, and the electromagnets are used to provide stability adjustments. Both types of magnets (permanent magnet and electromagnet) can be used to control the movement, spin/orientation, tilt, stability, combinations thereof, etc., of levitated objects. Each electromagnet is able to cause both attractive and repulsive magnetic force using the same hardware.

In an example implementation, permanent magnets and electromagnets can be configured at a 1:1 ratio. In another example, permanent magnet arrays can be placed in a first regular density, and electromagnets can be placed in a second regular density that is more or less dense than the first density. The densities of each group of magnets can vary based upon the environment and expected activities in different areas of an installation. Permanent magnets can be placed throughout a work surface such as a floor, and electromagnets can be placed at strategic locations where extra stability and control is needed. In the example of a floor, electromagnets can be located in an area such as near a loading dock. As yet another example, a path of permanent magnets can be flanked by electromagnets which provide forces to keep objects on the path.

The forces exerted by the permanent magnets on configuration space units can be altered by moving each individual magnet up and down with a linear actuator, or by rotating each magnet on a cylinder or disc, or by covering and uncovering each magnet with magnetically permeable material. An entire array of permanent and electromagnets can be moved up and down together by linear actuators. Also, a superconducting surface can provide levitation forces.

As described in patent applications PCT/US2021/045457 and PCT/US2021/072947, the disclosures of which are incorporated by reference, individual permanent magnets can be lifted up in a coordinated fashion to interact with permanent magnets, which are attached underneath a configuration space unit, creating repulsive and attractive magnetic forces which can lift and nudge the configuration space unit in any direction. Alternatively, electromagnets or a combination of electromagnets and actuated permanent magnets can be used to change the magnetic field in the X, Y, and/or Z direction, causing the same type of repulsive and attractive magnetic forces. Aspects herein can further utilize the methods for controlling levitation and building a levitation control system, as described in U.S. patent application Ser. No. 18/425,978 having the title, "Position Sensing System" which is incorporated by reference herein in its entirety, and U.S. provisional patent application 63/382,533 filed Nov. 6, 2022, and corresponding non-provisional Ser. No. 18/503,154 filed Nov. 6, 2023, the disclosures of which are incorporated by reference in their entirety.

In an example implementation of a movement system, a common mechanism is used to provide both the lift and the stability. For example in an actuated permanent magnet system, the actuated magnets can provide both the lift and the stability, provided that the magnets can respond and move fast enough. There is a limit however to the speed of mechanical motions, so that depending on the details of the actuators employed in the system, mechanical actuations alone may not be sufficient. In this regard, it is possible to implement lift and stability using two different systems.

Hybrid System Components—The Unit Cell

A magnetic movement system can be constructed using an array of hybrid system components, implemented as an array or bed of unit cells.

Referring now to the drawings, and in particular, to FIG. 1A, FIG. 1B, and FIG. 1C generally, a unit cell 100 is schematically illustrated. In an example implementation, the unit cell 100 comprises an electromagnetic coil 101, a magnet 102, and an actuator 103. The magnet 102 is coupled to the actuator 103 such that the actuator 103 causes movement of the magnet 102 defining an "actuated magnet".

The electromagnetic coil 101 comprises for example, conductive wire that is wrapped into a square tube or hollow cylinder tube. In the illustrated example, the electromagnetic coil 101 is wrapped with a large enough opening such that the permanent magnet 102 may be actuated through the center of the tube. Thus for example, the electromagnetic coil 101 can be positioned in-line with the arm of the linear actuator 103 so as to allow the permanent magnet 102 to reciprocate at least partially, through the opening/hole of the electromagnetic coil 101. An electric current is driven through the looped wire creating a magnetic field.

In other example implementations, the electromagnetic coil 101 can comprise one or more electromagnetic coils either in-line with the magnet 102, offset from the magnet 102, or in a pattern in cooperation with the magnet 102.

Thus, although described generally as an "electromagnetic coil" 101, in practice, the electromagnetic coil 101 can comprise one or more electromagnetic coils, each being the same or different, e.g., in size, wire gauge, number of turns, etc., each being driving by the same current or each electromagnetic coil being driven by a different current.

Likewise, the magnet 102 can be implemented by one or more magnets, for example, a permanent magnet or magnets (in any pattern or configuration), an arrangement of magnets, such as a Halbach array, a mix of permanent magnets having the same or different physical properties, orientations, magnetic properties, etc., an electromagnetic coil or electromagnetic coils (in any pattern or configuration), a mix of permanent magnets and electromagnetic coils, or combinations thereof, etc.

The actuator 103 is schematically illustrated as a linear actuator for sake of clarity of explanation. In this regard, the actuator 103 includes a drive mechanism and an arm that linearly extends and retracts (reciprocates) a programmable distance from the drive mechanism, up to a predetermined maximum extension. Movement of the arm of the actuator 103 causes corresponding movement of the magnet 102. Other actuator configurations are described more fully herein.

FIG. 1A-FIG. 1C illustrate the linear actuator 103 transitioning between three example states, including a first state wherein at least a portion of the magnet 102 is below the coil 101 (FIG. 1A); a second state where the magnet 102 is located within the opening of the coil 101 (FIG. 1B); and a third state where at least a portion of the permanent magnet 102 is located above the coil 101 (FIG. 1C). In some implementations, the magnet 102 need not be transitionable above the electromagnetic coil 101.

In example implementations, the magnet 102 reciprocates with the arm of the actuator 103. In this regard, the magnet 102 is also referred to herein as an "actuated magnet" to characterize its ability to move in cooperation with the actuator.

In some example implementations, the electromagnetic coil 101 may be fixedly positioned. For instance, as illustrated, the magnet 102 moves independently of the electromagnetic coil 101. Moreover, in some implementations, the electromagnetic coil 101 remains fixed and the magnet 102 is capable of movement relative to the electromagnetic coil 101. In other implementations, the electromagnetic coil 101 can move with the movement of the magnet 102, e.g., via an arm of the actuator 103.

FIG. 1A-FIG. 1C further illustrate an example controller 104, which may be communicably coupled to the electromagnetic coil 101, the linear actuator 103, or a combination thereof. The controller 104 can include a processor coupled to memory, where the processor reads out instructions from the memory, and is thus operatively programmed to carry out at least one operation that affects a position of a corresponding configuration space unit, e.g., to control movement, stability, etc., as described more fully herein. In this regard, the controller 104 may include, or may communicate with other ancillary devices (not shown) to carry out the functionality described herein, such as buffers, drivers, converters, current/voltage source(s), memory, I/O, etc. For instance, the controller 104 may send a pulse width modulated signal to the linear actuator 103, and a current to the electromagnetic coil 101, etc.

Figure 2:
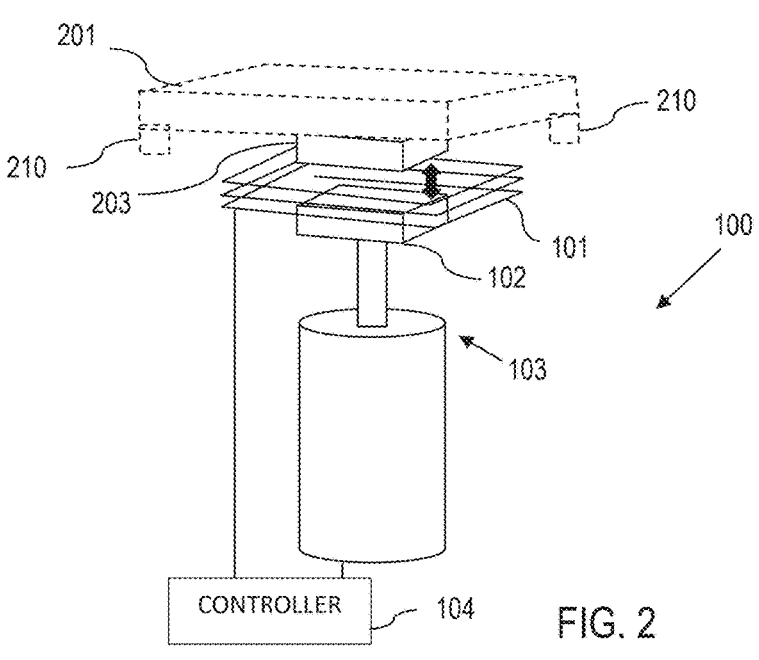
FIG. 2 illustrates an isometric side view of the actuated magnet with co-located wire coil shown in FIG. 1A-FIG. 1C, showing a magnetic force being exerted on a magnet.

Referring to FIG. 2, the unit cell 100 of FIG. 1 is illustrated interacting with a configuration space unit 201. Here, like elements of previous FIGURES are illustrated with like reference numbers, and as such, the previous disclosure is incorporated by reference and is applied by analogy unless otherwise noted.

As illustrated, the configuration space unit 201 has a magnet 203 (e.g., a permanent magnet) positioned thereon. In practical applications, the magnet 203 can be positioned on a bottom surface of the configuration space unit 201, e.g., so as to be positioned as close to the unit cell 100 as possible.

In an example implementation, the magnet 203 of the configuration space unit 201 is placed above or otherwise in proximity to the electromagnetic coil 101 and/or permanent magnet 102 of the unit cell 100. Here, the electromagnetic coil 101 and/or the actuated magnet 102 can be utilized to provide a magnetic force that interacts with the magnet 203 to act on the configuration space unit 201.

For instance, the force can affect a position of the configuration space unit 201, e.g., to perform at least one operation to levitate, tilt, spin/orient, move, propel, thrust, pull, push, stabilize, etc., the configuration space unit 201 relative to a work surface and the corresponding unit cell 100.

Moreover, the amount of force generated between the actuated magnet 102 of the unit cell 100 and the magnet 203 of the configuration space unit 201 can be determined/ controlled/established based upon the distance between the actuated magnet 102 and the magnet 203, as adjusted by the actuator 103. Correspondingly, the electromagnetic coil 101 can be used to provide a force, e.g., for repulsive levitation, attraction, stability adjustments, or a combination thereof to the magnet 203. Here, the strength of the field can be controlled by controlling an amount of current passing through the electromagnetic coil 101. Likewise, the electromagnetic coil 101 can be in an energized state where current passes through the conductive coil of the electromagnetic coil 101, or the electromagnetic coil 101 can be in an de-energized state where no current passes through the conductive coil of the electromagnetic coil 101. As such, a magnetic field generated by the electromagnetic coil 101 can by dynamic, and can even reverse in polarity, based upon the current driven through the electromagnetic coil 101.

Analogous to FIG. 1A-FIG. 1C, FIG. 2 further illustrates a controller 104. The controller 104 of FIG. 2 is analogous to the controller 104 of FIG. 1, and as such, any combination of features described with regard to the preceding FIGURES are incorporated into FIG. 2 unless otherwise stated.

Some implementations can incorporate bumpers 210 along the bottom edge(s) of the configuration space units. Each bumper 210 is any shape and/or configuration that may touch the floor as a configuration space unit starts to tilt beyond a certain Ox or Oy angle, indicating instability. These bumpers 210 effectively slow down the unstable motion, allowing the actuators more time to make required force adjustments. Bumpers 210 can be included on any implementation described more fully herein.

Example configurations can further incorporate springs into the bumpers, which apply a counteracting force to offset the forces of the unstable configuration space unit, thereby slowing down instability.

Figure 3:
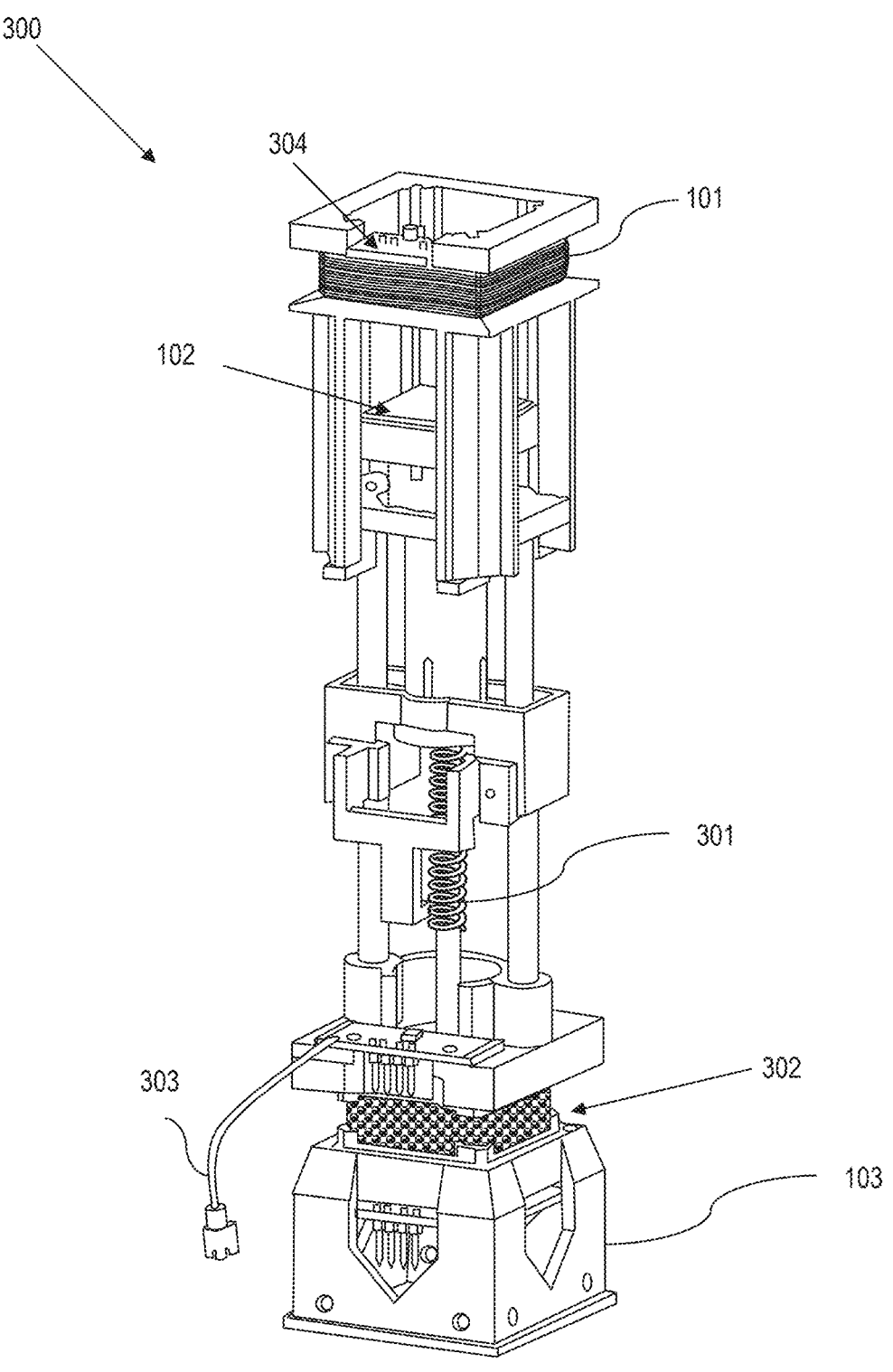
FIG. 3 illustrates a drawing of an isometric side view of a unit cell, which comprises an actuator motor, actuator, permanent magnet, electromagnetic wire coil, sensor node, and housing.

Referring to FIG. 3, a unit cell 300 is shown. Here, like elements of previous FIGURES are illustrated with like reference numbers, and as such, the previous disclosures herein are incorporated by reference and are applied by analogy to the description of FIG. 3. As such, any combination of features described with regard to the preceding FIGURES are incorporated into FIG. 3, unless otherwise stated.

FIG. 3 includes select components removed from the unit cell 300 for clarity of discussion. The unit cell 300 can implement the unit cell 100 of FIG. 1A-FIG. 1C, and/or FIG. 2. As such, the previous descriptions of the unit cell 100 can be incorporated by reference into the unit cell 300 of FIG. 3 in any combination, unless otherwise stated.

For instance, the unit cell 300 can include an electromagnetic coil 101, a permanent magnet 102, and an actuator 103, implemented as a linear actuator as illustrated. The actuator 103 is illustrated in FIG. 3 as including an actuator arm 301 with a motor 302, power cables and lines 303.

The unit cell 300 is also illustrated as having a sensor node 304. The sensor node 304 is configured to measure at least one kinematical aspect of the configuration space unit, e.g., alone or in combination with the controller (e.g., see controller 104, FIG. 1A-FIG. 2), other sensor nodes in other unit cells 300, or a combination thereof.

The unit cell 300 can further include other components, e.g., a housing/frame, mounting hardware, etc.

Figures 4, 5, 6:
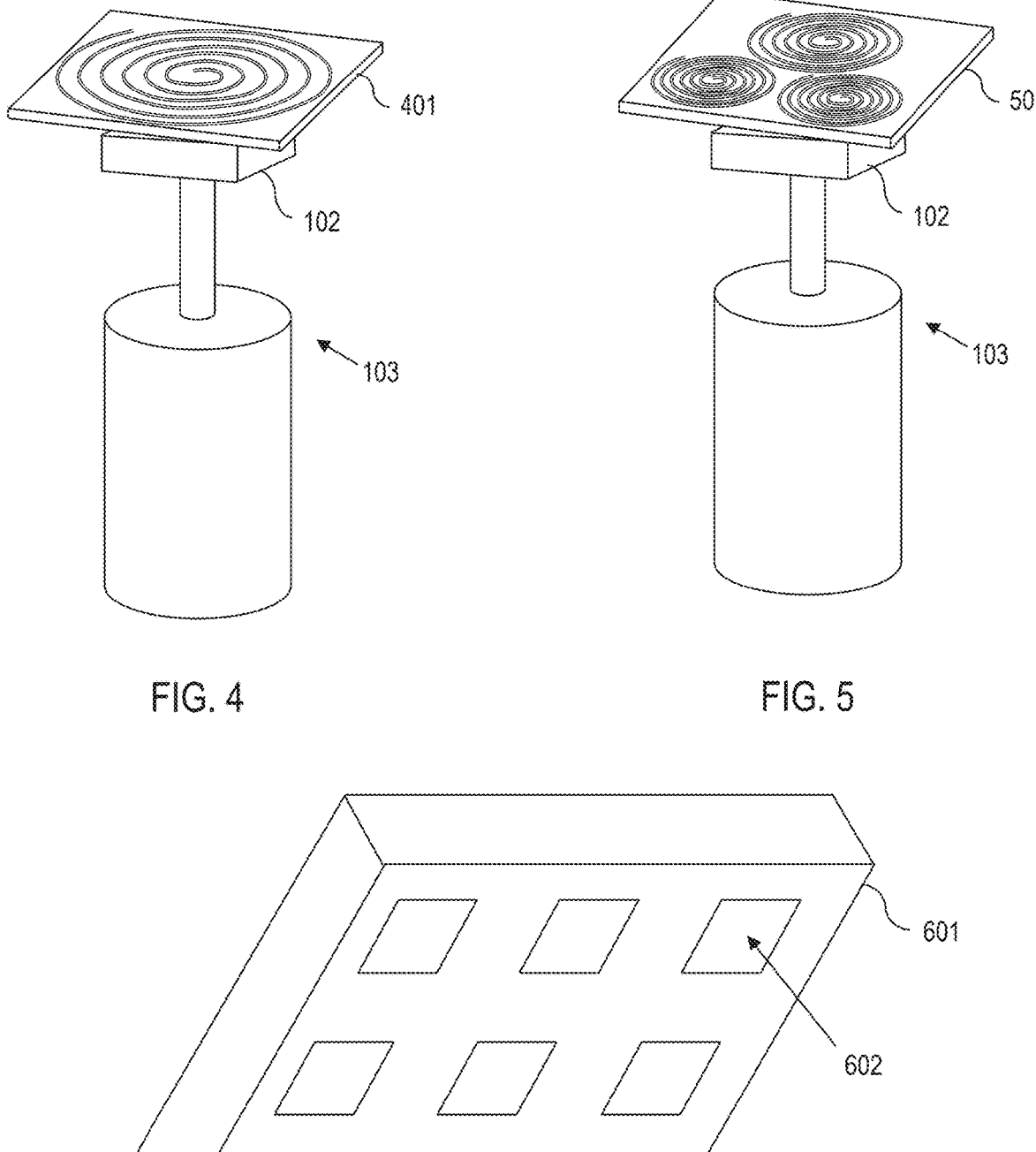
FIG. 4 illustrates an isometric view of an actuated magnet with a PCB electromagnetic coil located above the highest actuation level.
FIG. 5 illustrates an isometric view of an actuated magnet with a set of PCB electromagnetic coils located above the highest actuation level.
FIG. 6 illustrates an isometric view of the underside of a configuration space unit, showing an array of permanent magnets affixed to the bottom surface.

Referring to FIG. 4, another variation of the permanent magnet/coil hybrid unit cell 100 is shown. Here, like elements of previous FIGURES are illustrated with like reference numbers, and as such, the previous disclosure is incorporated by reference and is applied by analogy to FIG. 4. As such, any combination of features described with regard to the preceding FIGURES are incorporated into FIG. 4, unless otherwise stated.

FIG. 4 illustrates a Printed Circuit Board (PCB) based electromagnetic coil 401, which is combined with the actuated magnet 102, and is coupled to the linear actuator 103. The PCB based electromagnetic coil 401 can be provided in addition to, or in lieu of the electromagnetic coil 101 (FIG. 1A-FIG. 3).

In an example implementation, on the PCB, a copper trace is printed, e.g., in a spiral pattern. Current flows through the spiral to create a magnetic field. The magnetic field created in a coil increases with the number of turns of the wire or PCB trace. Generally speaking, the number of turns that can be created on a PCB is limited as compared to a wire wrapped coil, as there is limited space to print the spiral on the PCB surface. A multilayer PCB could be used to increase the number of turns, but this is limited by the number of PCB layers that can be economically fabricated.

Given that the PCB coil sits above the actuated magnets, its geometry need not match that of the actuators.

Referring to FIG. 5, yet another variation of the permanent magnet/coil hybrid unit cell 100 is shown. Here, like elements are illustrated with like reference numbers, and as such, the previous disclosure is incorporated by reference and is applied by analogy to FIG. 5. As such, any combination of features described with regard to the preceding FIGURES are incorporated into FIG. 5, unless otherwise stated.

In FIG. 5, a set of Printed Circuit Board (PCB) based electromagnetic coils 501 are combined with the actuated permanent magnet 102 coupled to the linear actuator 103. Analogous to FIG. 4, the set of PCB based coils 501 can be provided in addition to, or in lieu of the electromagnetic coil 101 (FIG. 1).

In FIG. 5, an arrangement of coils 501 with nonuniform geometry is shown. However, other coil configurations can be implemented. In this regard, each electromagnetic coil in the set of electromagnetic coils 501 can be energized or de-energized independently of other electromagnetic coils in the set of electromagnetic coils 501. Moreover, the current through each electromagnetic coil in the set of electromagnetic coils 501 can be independently controlled by a controller (e.g., controller 104, FIG. 1A-FIG. 2). Alternatively, all of the electromagnetic coils in the set of electromagnetic coils 501 can be driven with the same control signal.

Configuration Space Unit and Work Surface

An array of hybrid actuated magnet/electromagnet coils can be used as (or in combination with) a work surface, e.g., a floor to impart forces on a configuration space unit. The configuration space unit can comprise, for example, an object as described more fully herein. In an example implementation, the configuration space unit is lined with permanent magnets such that magnetic force between the magnetic fields generated by the unit cells and the magnets of the configuration space unit are repulsive, attractive, or a combination thereof, in order to act on the configuration space unit, e.g., to affect its position, to impart movement to the configuration space unit, etc.

Configuration Space Unit

As noted above, at least one configuration space unit is within an environment (e.g., within a configuration space) of a work surface. Referring to FIG. 6, a configuration space unit 601 includes a surface that faces a corresponding work surface (e.g., the floor in the above-example). Here, an underside of the configuration space unit 601 is illustrated. FIG. 6 includes aspects analogous to those described with reference to the preceding FIGURES. As such, like structure is illustrated with like reference numbers unless specifically stated. In this regard, the disclosures of the preceding FIGURES are incorporated by reference into FIG. 6 in any combination unless otherwise stated.

In order to identify, orient, levitate, stabilize, move, etc., the configuration space unit 601, a surface of a configuration space unit 601 is equipped with magnets, e.g., permanent magnets 602. In the example implementation, the magnets 602 are located on an underside surface of the configuration space unit 601 and are arranged in a pattern similar to a checkerboard, omitting every second magnet and (correspondingly) adding space between magnets 602. Other patterns, or arrangements can alternatively be implemented. By comparison, a corresponding work surface can integrate an array of unit cells, e.g., a full grid pattern of unit cells 100. In an example implementation, the configuration space unit magnets 602 are arranged and spaced such that the configuration space unit magnets 602 cannot all simultaneously be positioned directly above the same floor unit cell 100.

Figure 7:
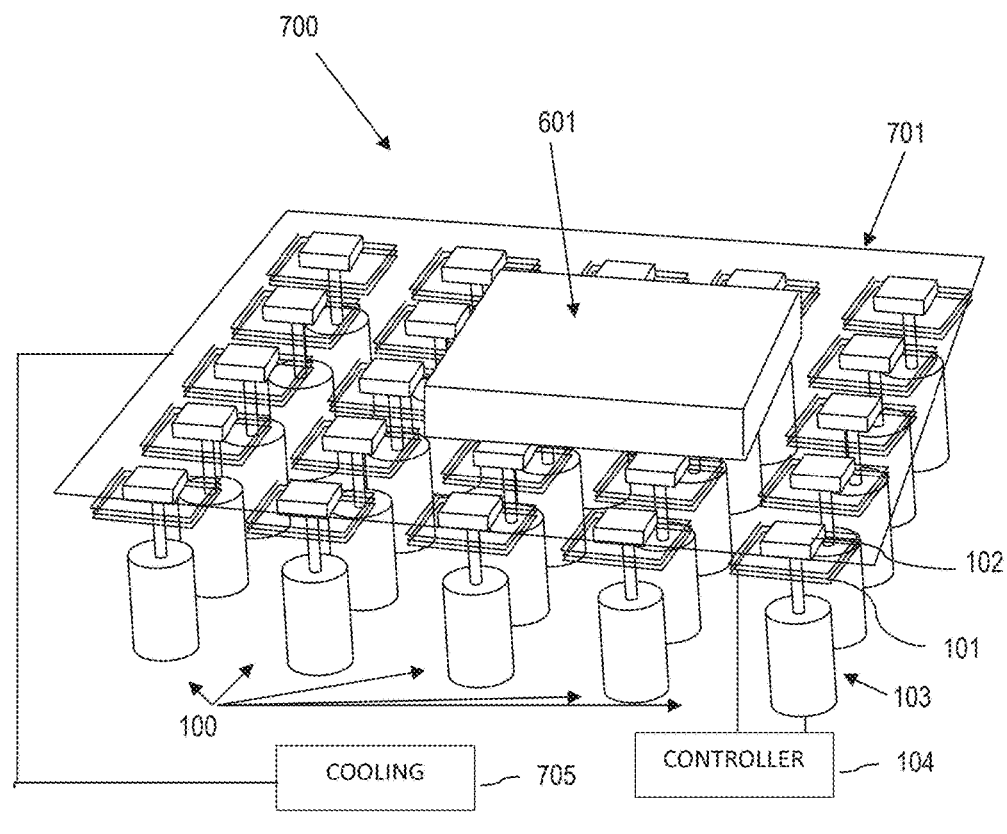
FIG. 7 illustrates an isometric view from the top and side of a movement system with a floor array of actuated permanent magnets and electromagnetic coils residing beneath a floor, and a configuration space unit above the floor.

FIG. 7 illustrates a movement system 700, which includes unit cells 100 (e.g., an array of unit cells 100) and a configuration space unit 601 in cooperation with a work surface 701, implemented as a floor in this example. Here, like elements of previous FIGURES are illustrated with like reference numbers, and as such, the previous disclosure is incorporated by reference and is applied by analogy. Any combination of features described with regard to the preceding FIGURES are incorporated into FIG. 7 unless otherwise stated.

A square shaped configuration space unit 601 (analogous to the configuration space unit 601, FIG. 6) is shown positioned (e.g., levitated) over the work surface 701 (floor in this example) that comprises an array of unit cells 100 (FIG. 1), e.g., an array where each unit includes a hybrid configuration of an electromagnetic coil 101, a magnet 102 and an actuator 103 analogous to that described more fully herein.

In an example implementation, the actuated magnets 102 are dynamically adjusted via corresponding actuators 103 to provide a levitation force. The faster responding electromagnetic coils 101 provide stability, which may involve repulsive and/or attractive forces, e.g., depending on whether to achieve stability, the configuration space unit needs to be pushed or pulled relative to the location of each electromagnet coil 101. In an example implementation, the actuated magnets 102 provide the Z forces, whereas the electromagnet coils 101 provide the X, Y, and Ox, Oy and Oz forces. The actuated magnets 102 may be updated at a first frequency to maintain desired Z forces, while the faster responding electromagnet coils may be updated at a higher frequency to maintain the configuration space unit's desired position and provide stability.

FIG. 7 further illustrates a controller 104 (analogous to controller 104 described with reference to FIG. 1A-FIG. 1C, and FIG. 2) electrically coupled to one or more unit cells 100. In practice, the controller 104 can be electrically coupled to each unit cell 100. The controller 104 is shown in FIG. 7 as being only electrically coupled to a single unit cell 100 for clarity of illustration. In practice, the controller 104 ultimately controls each unit cell 100. Moreover, for each unit cell 100, the controller 104 can electrically couple to the corresponding electromagnetic coil 101, actuator 103, any sensors, combinations thereof, etc. For instance, when using a unit cell 100 including features such as those described with reference to the unit cell 300 (FIG. 3), the controller 104 can communicably couple to a sensor node (e.g., sensor node 304, FIG. 3) of one or more unit cells.

In an example implementation, a movement system comprises a configuration space unit 601 having a magnet, such as one or more permanent magnets 602 (e.g., see FIG. 6). A magnetic movement system is configured to move, pull, push, levitate, or some combination thereof, the configuration space unit 601.

In an example implementation, a system comprises a work surface (e.g., the work surface 701 implemented as a floor in FIG. 7), a configuration space unit (e.g., configuration space unit 601, FIG. 6, FIG. 7), and a magnetic movement system (e.g., unit cells 100, controller 104, etc.). The work surface has a configuration space associated therewith. For instance, in the example of the work surface comprising a floor, the configuration space is an area or volume above the floor, wherein the effects of magnetic fields from the unit cells 100 can act on an object. In this regard, the configuration space unit is positionable within the associated configuration space of the work surface. The magnetic movement system has unit cells (e.g., any implementation herein of unit cells 100, e.g., as illustrated in FIG. 1A-FIG. 5, FIG. 7) arranged in cooperation with the work surface. Each unit cell comprises an actuator 103, a magnet 102 coupled to the actuator 103 such that the actuator causes movement of the magnet 102 (defining an "actuated magnet"), and an electromagnetic coil 101, analogous to that set out more fully herein. Moreover, the magnetic movement system is configured such that a magnetic field produced by at least one unit cell 100 performs at least one operation that affects a position of the configuration space unit within the configuration space of the work surface.

In some implementations, a controller 104 is operatively programmed to control the unit cells 100 of the magnetic movement system to perform the at least one operation to levitate, tilt, spin/orient, move, propel, thrust, pull, push, or combinations thereof, the configuration space unit 601 relative to the work surface 701. In this implementation, the controller 104 can be programmed to carry out each operation based issuing commands to at least one unit cell 100 to selectively control the actuator 103 to adjust a position of the actuated magnet 102 relative to the work surface 701, selectively communicate a signal to the electromagnetic coil 101 to control a field generated thereby, or selectively control both the actuator 103 and the communicated signal to the electromagnetic coil 101.

Moreover, in some implementations, each unit cell 100 of the magnetic movement system can further comprise a sensor node 304 (sensor node 304, FIG. 3) that is configured to measure at least one kinematical aspect of the configuration space unit. In this implementation, the controller 104 can be further operatively programmed to collect measurements from at least one sensor node, detect an instability of the configuration space unit 601 based at least in part, from the collected measurements, and provide a command to the magnetic movement system to output a time-varying magnetic field which reacts to the detected instability based upon the collected measurements to provide a magnetic field which counters the instability.

As another example, the sensor node 304 (FIG. 3) can measure position, velocity, acceleration, or a combination thereof.

In still another example, the sensor node 304 (FIG. 3) measures position. Here, the controller 104 can detect instability based upon a sensed position determined from the collected measurements, determine the configuration space unit to be drifting from a desired position, and provide the command to the magnetic movement system to apply a countering force to the magnet of the configuration space unit.

Yet further, the controller 104 can be operatively programmed to control at least one unit cell such that the controller operates the electromagnetic coil at a first frequency, and the controller operates the actuator at a second frequency, where the first frequency is greater than the second frequency.

As another example, the controller 104 can be operatively programmed to control at least one unit cell 100 such that the controller 104 operates the actuator 103 and hence, the actuated magnet 102 in the Z direction to control levitation of the configuration space unit 601, and the controller 104 controls the electromagnetic coil 101 to control X and Y direction forces, and θx, θy and θz torques to control stability of the configuration space unit 601.

In still another example, the controller 104 can be operatively programmed to control at least one unit cell 100 such that the controller 104 operates the actuator 103 and hence, the actuated magnet 102 in the Z direction to control levitation of the configuration space unit 601. Also, the controller 104 controls at least one of the actuator 103 and the electromagnetic coil 101 to control X and Y direction forces, and θx, θy and θz torques to control stability of the configuration space unit 601.

In a further example, the controller 104 can be operatively programmed to control at least one unit cell 100 such that the actuated magnet 102 of at least one unit cell 100 provides levitation forces (Z forces) of the configuration space unit 601, whereas the electromagnetic coil 101 provide high frequency lateral force adjustments (X and Y) needed to maintain levitation stability and keep the configuration space unit 601 on a desired path.

In some implementations, for at least one unit cell, the electromagnetic coil is situated in line with movement of the magnet via the actuator, and a controller is operatively programmed to selectively operate the actuator to facilitate levitation of the configuration space unit, and to selectively modify properties of the electromagnetic coil to affect the stability of the configuration space unit.

As noted more fully herein, in some implementations, the electromagnetic coil is on a printed circuit board (e.g., see electromagnetic coil 401, FIG. 4), which is coupled to the actuated magnet 102 and/or actuator 103. In an example, the electromagnetic coil on the printed circuit board comprises a coil that is part of a set of electromagnetic coils (e.g., electromagnetic coils 501, FIG. 5).

In some implementations, for at least one unit cell, the actuated magnet 102 is moveable by the associated actuator 103 relative to the work surface 701 and the electromagnetic coil 101 is stationary relative to the work surface 701 (e.g., fixed below, within, as part of the unit cell, dissociated from the unit cell, etc.). As an alternative, the actuated magnet 102 and the electromagnetic coil 101 can both be moveable by the associated actuator 103 relative to the work surface 701. As another example, the actuated magnet 102 can be part of a set of magnets arranged in a first pattern, and the electromagnetic coil 101 is part of a set of electromagnetic coils arranged in a second pattern different from the first pattern.

In some implementations, the movement system can further comprise a cryogenic cooling system to cool the electromagnetic coil. For instance, a cooling system 705 can provide the necessary conditioning to implement efficient operation.

As will be described in greater detail herein, e.g., with reference to FIG. 8, the configuration space unit 601 can be implemented as a conveyance system that includes at least one of wheels, rollers, casters, or bearings, so that complete levitation is not strictly required to effect movement of the conveyance system within the configuration space by the magnetic movement system. In an example, a weight of a load on the conveyance system is carried in a manner that is split between an assist provided by the magnetic movement system and the conveyance system.

In some example implementations, the actuated magnet 102 of each unit cell 100 is varied in at least one of default height or magnetic strength.

In further implementations, at least one actuator comprises a select one of a linear actuator, an actuator that affects rotating the corresponding permanent magnet on a cylinder or disc, or an actuator that selectively covers and uncovers the corresponding permanent magnet with a magnetically permeable material, as will be described in greater detail herein.

In some systems, the configuration space unit 601 can comprise a magnet 602 (FIG. 6) in cooperation with the work surface 701. Here, the actuated magnet 102 and the electromagnetic coil 101 of each unit cell 100 generate magnetic fields that interact with the magnet 602 of the configuration space unit 601 to carry out each operation.

According to further aspects herein, a system comprises a configuration space unit 601, a magnetic movement system, and a controller 104. The magnetic movement system is configured to perform at least one operation to levitate, tilt, spin/orient, move, propel, thrust, pull, or push the configuration space unit 601. In this regard, the magnetic movement system has unit cells 100, where each unit cell 100 comprises an actuator 103, a magnet 102 coupled to the actuator 103 such that the actuator 103 causes movement of the magnet 102 (thus defining an actuated magnet), and an electromagnetic coil 101. The controller 104 is operatively programmed to control the unit cells 100 of the magnetic movement system to perform the at least one operation. More particularly, the controller 104 is programmed to carry out each operation based issuing commands to at least one unit cell 100 to selectively control the actuator 103 to adjust a position of the actuated magnet 102 relative to the work surface 701, selectively communicate a signal to the electromagnetic coil 101 to control a field generated thereby, or selectively control both the actuator 103 and the communicated signal to the electromagnetic coil 101.

As still another example, a system comprises a configuration space unit 601, a magnetic movement system, and a controller 104. The configuration space unit 601 has a magnet 602 (FIG. 6) and a conveyance system, e.g., at least one of casters, wheels, rollers, bearings, etc., on a bottom thereof. The magnetic movement system is configured to utilize magnetic forces in cooperation with the magnet 602 (FIG. 6) on the bottom of the configuration space unit 601 to move the configuration space unit 601 across a work surface 701. In this regard, the magnetic movement system has unit cells 100 that cooperate with the work surface 701. Each unit cell 100 comprises at least one of an actuator 103 and a permanent magnet 102 coupled to the actuator 103 such that the actuator 103 causes movement of the permanent magnet 102. Each unit cell 100 also includes an electromagnetic coil 101. The controller 104 is communicably coupled to unit cells 100. Moreover, the controller 104 is operatively programmed to control select unit cells 100 to carry out the movement of the configuration space unit 601 across the work surface 701.

In this example, the configuration space unit 601 may be levitated, e.g., to not touch the work surface 701 (e.g., a floor in this example).

As another example, the configuration space unit may further comprise bumpers (e.g., bumpers 210, FIG. 2) along the bottom edges thereof, that may touch the work surface as a configuration space unit starts to tilt beyond a certain θx or θy angle.

Yet further, although a single controller 104 is schematically shown, in practice, the controller 104 and/or its functions can be distributed. For instance, depending upon the size of the movement system 700, it may be desirable to allocate a sub-controller 104 to a cluster, e.g., a group, array, section, etc., of unit cells. Where multiple controllers 104 are utilized, the various sub-controllers 104 can be controlled by a supervisory controller 104 (or controllers) in any practical hierarchy.

The combined actuated magnet/electromagnetic system is incorporated into an active feedback loop in which the position of the configuration space unit 601 is compared to a target position, e.g., by the controller 104. By way of example, each unit cell 100 can include a Hall effect sensor or suitable device for detecting the configuration space unit 601 (or configuration space units 601).

In some implementations, the controller 104 is operatively programmed to control the configuration space unit 601, e.g., to control and or establish a position of the configuration space unit 601, an orientation of the configuration space unit 601, movement of the configuration space unit 601 across the floor, combinations thereof, etc. If the sensed position of the configuration space unit 601 deviates from its target position, then the controller 104 controls one or more select unit cells 100 to apply restoring forces to keep the configuration space unit 601 in a stable position/orientation. Various approaches can be implemented.

In an example approach, for each unit cell 100, the electromagnetic coils 101 are used exclusively for the lateral stability, and the actuated magnets 102 are used exclusively to vertically support the load. In this scheme the magnet actuations are controlled by the controller 104 in such a way that they do not respond to any small changes in lateral position of the configuration space unit 601. This reduces unnecessary wear on the mechanical actuators in the system.

In another approach to active feedback by the controller 104, both the actuated magnets 102 and the electromagnetic coils 101 are used to provide lateral stability. In this case, the actuated magnets 102 and the coils 101 respond to any lateral deviations of the configuration space unit 601 from its target position. In such a system, care must be taken so that the two systems do not interfere with each other as unnecessary power consumption could be induced (e.g. the permanent magnets are pulling while the electromagnet is pushing).

In some configurations, the work surface 701 implements a false floor, which can be added between the configuration space unit 601 and the electromagnet coils 101. This hybrid system can be compared to a system that uses only electromagnetic coils 101. In a coils-only floor system, the levitation force and the stability are provided by electromagnetic coils in the floor. However, the power consumed by an electromagnetic coil dominated by resistive losses is given by the expression $P=RI^2$ where R is the coil resistance and I is the coil current.

The expression shows that the power consumption, P, increases with the square of the current. Therefore, doubling the levitation force requires a factor of four increase in power. The hybrid system has an advantage in that the levitation force is provided by the permanent magnets, which requires no power except the power consumed by the mechanical actuators. Thus, the hybrid actuated magnet/electromagnet coil system consumes less power to levitate relatively heavy loads as compared to an electromagnet coil-only system.

Some implementations can utilize a cryogenic cooling system 705, e.g., a system of jets that utilize a cryogenic coolant, to cool the coils 101 in the above configuration to cryogenic temperatures where the coil conductor becomes superconducting. In this case, the current flows in the coils without resistance, mitigating the $P=RI^2$ losses in a conventional conductor.

However, power will be consumed in keeping the system at the extremely low temperatures, and extensive insulation would be required to isolate the cooled coils from the rest of the system.

Figure 8:
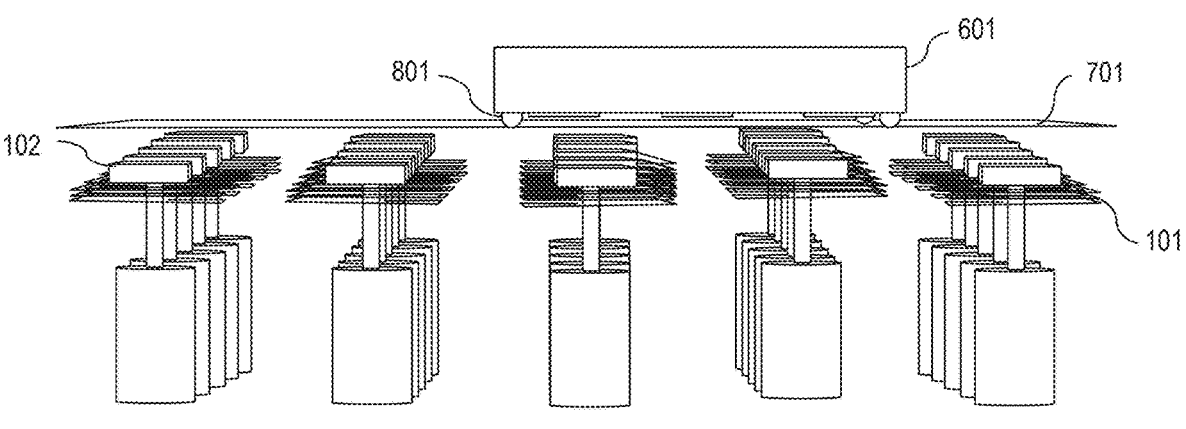
FIG. 8 illustrates an isometric view from the side of a movement system with a floor array of actuated permanent magnets and electromagnetic coils residing beneath a floor, and a configuration space unit resting on wheels, being moved across the floor by the underlying magnets.

Referring to FIG. 8, aspects of the movement system 700 of FIG. 7 are illustrated. Here, like elements of previous FIGURES are illustrated with like reference numbers, and as such, the previous disclosure is incorporated by reference and is applied by analogy. As such, any combination of features described with regard to the preceding FIGURES are incorporated into FIG. 8 unless otherwise stated.

In FIG. 8, a conveyance system 801, e.g., wheels, rollers, casters, bearings, etc., can be added to the configuration space unit 601, so that full (off the work surface) levitation is not necessary. By way of illustration and not by way of limitation, FIG. 8 illustrates a configuration space unit 601 with spherical bearing rollers 801 underneath. The bearings can be used to support all or part of the load of the object for improved power consumption. Furthermore, a means of contact between the configuration space unit and the floor 701 provides stability, reducing the required actuation speeds of the actuated permanent magnets within the floor. So, as an example, 95% of the load could be supported by the actuated magnets, while only 5% of the load remains on the bearings and the floor, dramatically reducing the wear and tear on the bearings, and reducing the forces required to transport the configuration space unit (as compared to full levitation). Here, the levitation supplied by the movement system is a force assist that works to counter some of the force of gravity to facilitate more efficient movement, orientation, spin, etc., of a corresponding configuration space unit.

Countering gravity has an effect of reducing friction. Reduced friction is of interest, e.g., where a configuration space unit is not completely levitated. In a frictionless system, there would be no need to counter gravity—a goal of movement can be accomplished with pushing and/or pulling forces in X and Y and θz.

The false floor 701 is assumed to be sufficiently smooth and clean, creating a low friction surface for the bearings to roll across. Lateral forces created by the combined system of permanent magnets 102 and coils 101 within the floor can be used to transport the configuration space unit across the false floor 701. The configuration space unit 601 schematically illustrated in FIG. 8 uses spherical bearings, but the conveyance system can utilize any type of rollers or sliders, including wheels, casters or other low friction attachments.

Figure 9:
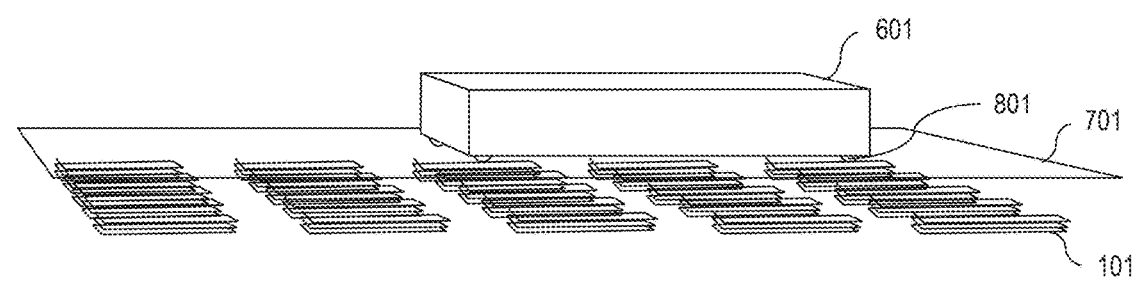
FIG. 9 illustrates an isometric view from the side of a movement system with a floor array of electromagnetic coils residing beneath a floor, and a configuration space unit resting on wheels, being moved across the floor by the underlying magnets.

Referring to FIG. 9, the movement system of FIG. 8 is illustrated. Here, like elements of previous FIGURES are illustrated with like reference numbers, and as such, the previous disclosure is incorporated by reference and is applied by analogy. Any combination of features described with regard to the preceding FIGURES are incorporated into FIG. 9 unless otherwise stated.

In FIG. 9, the magnets are removed from the system and only the electromagnetic coils 101 are used to transport the configuration space unit 601 (e.g., using attractive (pulling) and/or repulsive (pushing) forces) on the work surface 701, e.g., a false floor. FIG. 9 also illustrates a configuration space unit 601 having a conveyance system 801, e.g., wheels, rollers, casters, bearings, etc.

Since all or a part of the load of the configuration space unit 601 is supported by the conveyance system 801, this system is lower power than a fully levitated coil-based system.

Figure 10:
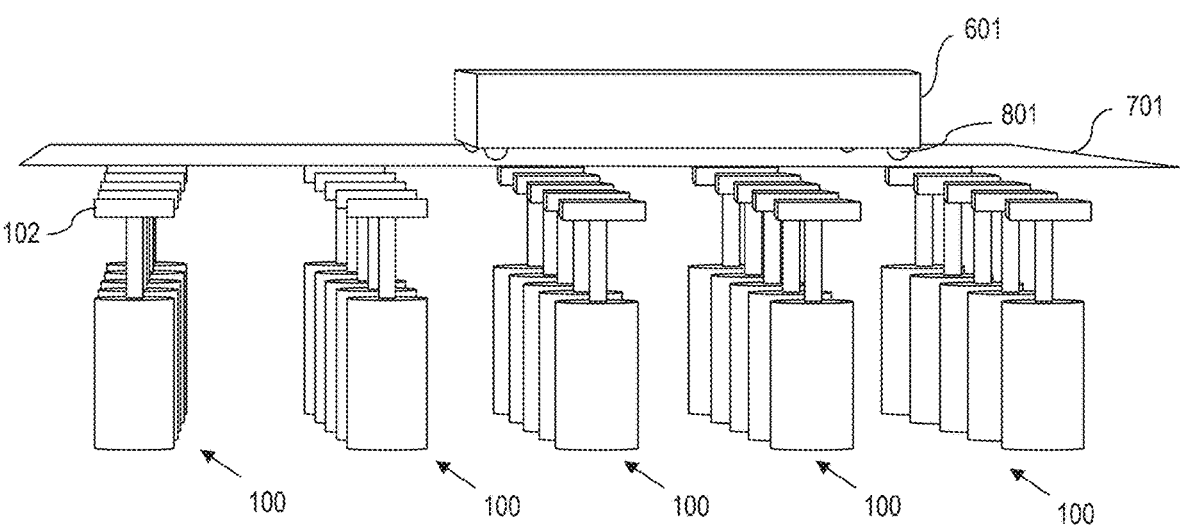
FIG. 10 illustrates an isometric view from the side of a movement system with a floor array of actuated permanent magnets residing beneath a floor, and a configuration space unit resting on wheels, being moved across the floor by the underlying magnets.

Referring to FIG. 10, the movement system of FIG. 8 is again illustrated. Here, like elements of previous FIGURES are illustrated with like reference numbers, and as such, previous disclosure is incorporated by reference and is applied by analogy. Any combination of features described with regard to the preceding FIGURES are incorporated into FIG. 10 unless otherwise stated.

In FIG. 10, the electromagnetic coils of one or more unit cells 100 are removed and the system includes actuated permanent magnets 102 and a configuration space unit 601 having a conveyance system 801, e.g., wheels, rollers, casters, bearings, etc., on a work surface 701. The actuated magnets 102 provide lateral forces to transport the configuration space unit 601 in the X-Y plane. In this implementation, the conveyance system 801 support some or all of the load, providing stability and reducing the required speed of the actuated magnets 102 to provide a consistent lifting force.

In another configuration, wheels are placed on configuration space units 601, but while the configuration space unit is levitated, the wheels do not touch the work surface 701, e.g., the false floor. Instead, these wheels only come in contact with the floor:

(1) when the actuated magnet system is non-functional, or when part of the actuated magnet system is non-functional, allowing the configuration space unit to be manually relocated; over the non-functioning portion; or (2) to allow configuration space units to be pushed over surfaces that do not contain the floor of actuated magnets.

The wheeled system of the configuration space unit 601 can be designed to support and transport a target load. A load exceeding the target load may be placed on the configuration space unit, and in this implementation, the system adjusts the magnetic forces from the actuated permanent magnets and electromagnets such that the target load rests on the wheels of the configuration space unit, while the remaining load is supported by the actuated permanent magnets and/or electromagnets. Load balancing can be described as Total Load=Target load on Configuration space unit Wheels+Load supported by Magnetic Forces.

The load placed on the configuration space unit 601 can be determined prior to or after being placed on the configuration space unit. The movement system then has the information it needs to supply constant levitation forces sufficient to levitate a load of magnitude=Total Load−Target Load on Configuration space unit Wheels.

Figures 11A, 11B, 11C, 11D:
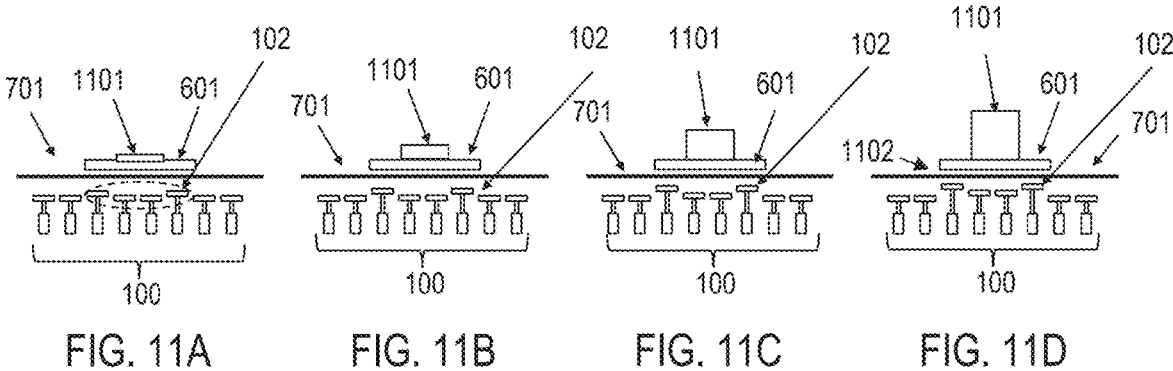
FIG. 11A-FIG. 11D show several side views illustrating different permanent magnet actuation levels which are necessary to lift varying loads.

Referring to FIG. 11A-FIG. 11D generally, a magnetic movement system of unit cells 100 provide a plurality of permanent actuated permanent magnets 102 under a work surface 701 upon which a configuration space unit 601 carries a load 1101. The load 1101 in FIG. 11B is heavier than the load 1101 in FIG. 11A. Likewise, the load 1101 in FIG. 11C is heavier than the load 1101 in FIG. 11B. Yet further, the load 1101 in FIG. 11D is heavier than the load 1101 in FIG. 11C.

A scenario is illustrated where the weight of a levitated load can be determined using the described movement systems. The system incorporates a proximity sensor which detects the distance from the configuration space unit 601 with the levitated load 1101 to the sensor. The sensor can be located in, on or under the work surface 701, and can be co-located with a unit cell 100. In the preferred implementation, a levitated known load is kept at a fixed distance above the sensor or equivalently at a fixed distance from the work surface 701. In this implementation, the vertical displacement of the actuated magnets 102 is adjusted to keep the known load at the target height. Heavier loads require that the actuated magnets are closer to the levitated load to provide more force.

FIG. 11D shows that heavier loads (represented by larger load volumes in the figure) require that the actuated magnets 102 are closer to the magnets in the levitated configuration space unit 601 compared to FIG. 11A, FIG. 11B, and FIG. 11C, in order to maintain a fixed levitation gap 1102 between the configuration space unit 601 and false floor 701.

Thus, referring to FIG. 11A-FIG. 11D generally, the magnets 102 required for levitation are closest to the floor 701 in FIG. 11D due to the load in FIG. 11D being the heaviest illustrated. By comparison, the magnets 102 required for levitation are furthest from the floor 701 in FIG. 11A due to the load in FIG. 11A being the lightest illustrated. FIG. 11B and FIG. 11C show incremental configurations between FIG. 11A and FIG. 11D.

In example configurations, simulations can be performed to quantify this effect. In the simulations a set of actuations are optimized to support a load of 110N at 0.25 centimeter (cm) from a false floor 701. The magnets can be uniformly lowered in the simulation while keeping the configuration space unit fixed.

Figure 12:
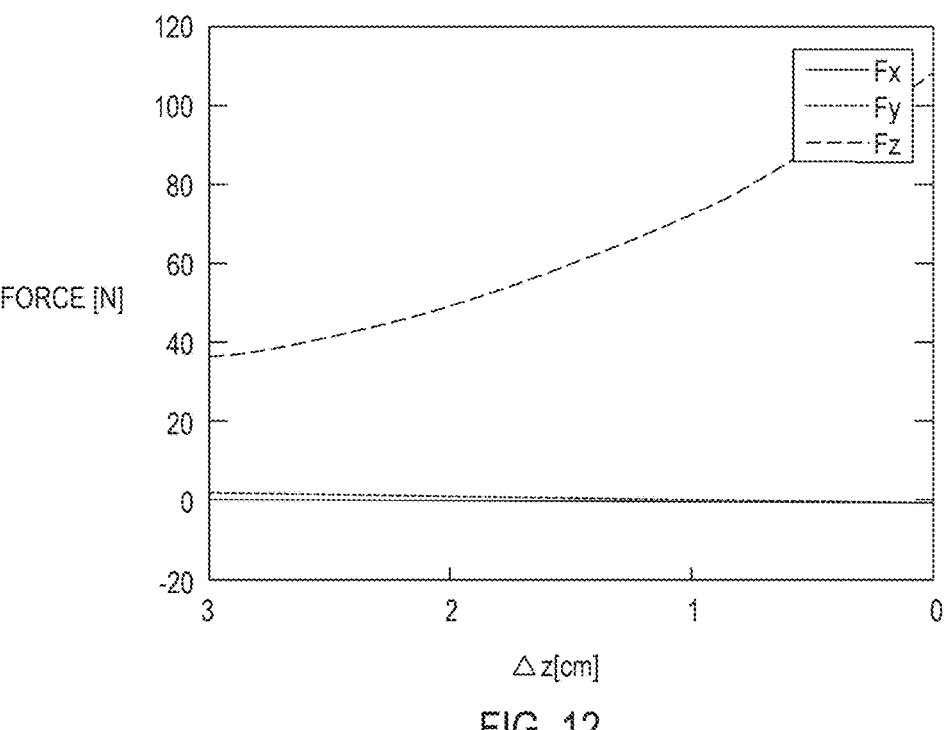
FIG. 12 shows a line graph illustrating the amount of force exerted in Newtons, as a function of the distance between two magnets with opposing polarity.

Referring to FIG. 12, a chart illustrates a result where the force on the levitated load can be calculated as a function of displacement of the actuated magnets, AZ, from the false floor 701.

A levitated object without dynamic forces to maintain stability will rapidly gravitate towards a non-levitated state. Stability of a levitated object can be viewed as ball resting on the top of a very steep hill, such that if the ball moves in any direction, it rapidly loses stability. The further the ball moves from the top of the hill, the more energy it takes to stop the ball and move it back to the top of the hill. In the same way, the longer the response time before adjusting forces are applied to a correct a configuration space unit's position, the more energy must be consumed to maintain levitation.

Using this same analogy, to reduce the required levitation forces, or the speed and frequency of the required force adjustments, the system can reduce the slope of the hill, create speed bumps, or counter balancing forces. In an example system, some techniques to achieve analogous reductions in the speed of instability include any one or more of the following, by way of example.

Miscellaneous Considerations Applicable to All
Disclosures Herein

In an example configuration, an array of actuated magnets and/or electromagnet coils used as a work surface such as a floor may have some of the actuated permanent magnets attached to an actuator that can actuate (move) much more rapidly than other actuators in the floor system. These fast moving actuated magnets may have their heights adjusted at higher rates than other actuators in the system.

Furthermore, some actuators may be mounted with permanent magnets that are higher strength than other magnets. Incorporating a proportion (such as ¼th or ⅛th) of the actuators with fast moving actuators that are updated at a higher frequency, which may also have higher strength magnets, can alleviate or eliminate the need for faster responding electromagnet coils.

In another configuration, the actuated permanent array may be placed along narrow paths, while electromagnets may be placed on the perimeters of the path. In this system, the actuated permanent magnets provide the levitation forces (Z forces), while the electromagnets on the edges of the path provide the high frequency lateral force adjustments (X and Y) needed to maintain levitation and keep the levitated configuration space unit on the desired path, e.g., over the bed of actuated permanent magnets and between the electromagnets along the perimeter.

Example Component Configurations

Figure 13:
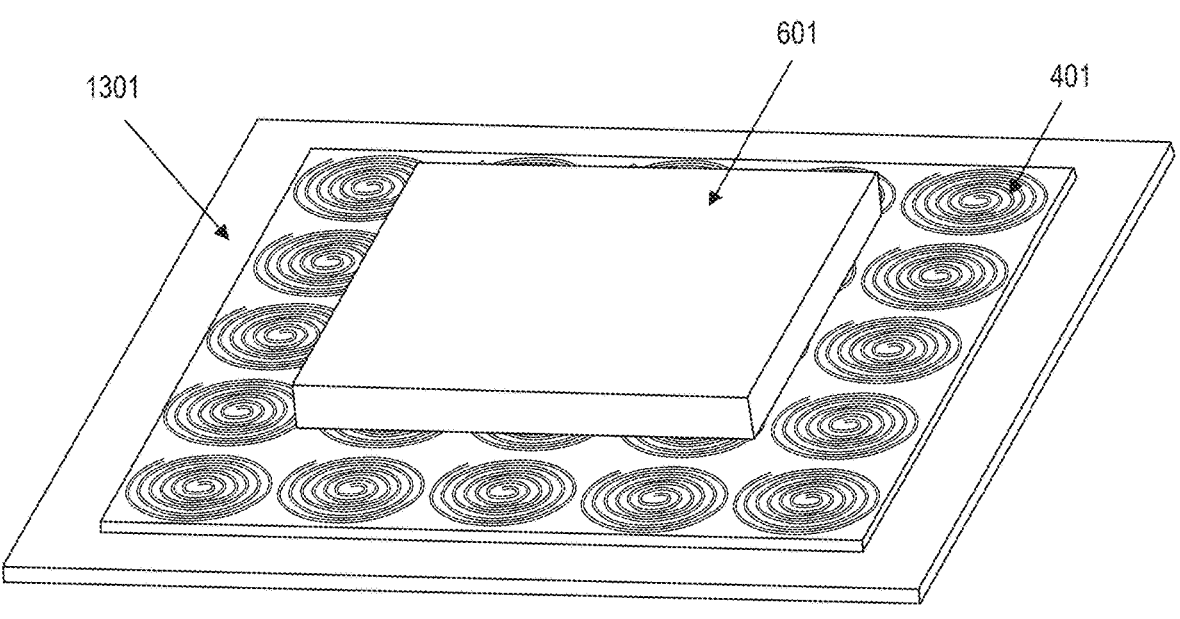
FIG. 13 illustrates an isometric top view of a superconducting floor surface, with an array of PCB coils which are levitating a configuration space unit above.

Referring to FIG. 13, in another configuration, the magnetic movement system comprises of a configuration space unit 601 consisting of permanent magnets levitated over a superconducting surface. This system relies on the Meisner effect to provide stable levitation to the configuration space unit. This system is different from traditional magnetic movement systems in that guiding rails are not used. Rather, the levitated object is free to move across the floor in any arbitrary direction in two dimensions. This implementation requires that the floor be cooled to cryogenic temperatures.

In the example of this configuration shown in FIG. 13, thin profile electromagnet coils or PCB coils 401 are integrated above a superconducting surface 1301. In this example, the superconducting surface 1301 provides the levitation forces, while the coils 401 provide the lateral forces needed to move and stabilize the levitated configuration space unit 601. It should be noted that the Meisner effect is not subject to Earnshaw's theorem and is in fact stable.

In another example implementation, the floor comprises electromagnet coils, actuated permanent magnets, or both. The configuration space unit comprises a superconducting surface at the bottom of the configuration space unit, which provides stable levitation when repulsive forces are applied by the magnets within the floor. The repulsive and/or attractive forces applied by the magnets within the floor transport the configuration space unit across a false floor. A cryogenic cooling system can be used to maintain the superconducting surface also resides atop the configuration space unit, along with the electrical power system to power the cooling system.

In yet another implementation, a cryogenic fluid and superconducting surface are separated from the cryogenic cooling system. In this manner, the configuration space unit incorporates a "superconducting module" that includes the cryogenic fluid and superconducting surface, but the configuration space unit does not contain the cryogenic cooling system nor the electrical power system. When the temperature of the superconducting module nears the point where superconductivity would be lost, the superconducting module connects to a stationary cryogenic cooling system to recharge. The configuration space unit can be permanently connected to the superconducting module, or the superconducting module can be swapable, so that the superconducting module needing recharging can be replaced by a fully charged superconducting module.

The methods described within this patent application describing dynamically adjusting the magnetic forces applied to permanent magnets embedded within configuration space units through mechanical actuations of permanent magnets can be accomplished in a number of ways. While FIGS. 1A-5, 7, 8, 10 and 11A-11D show permanent magnets lifted by linear actuators, permanent magnets can also be actuated through an actuator that comprises a rotational mechanism as shown in FIG. 14.

Figure 14:
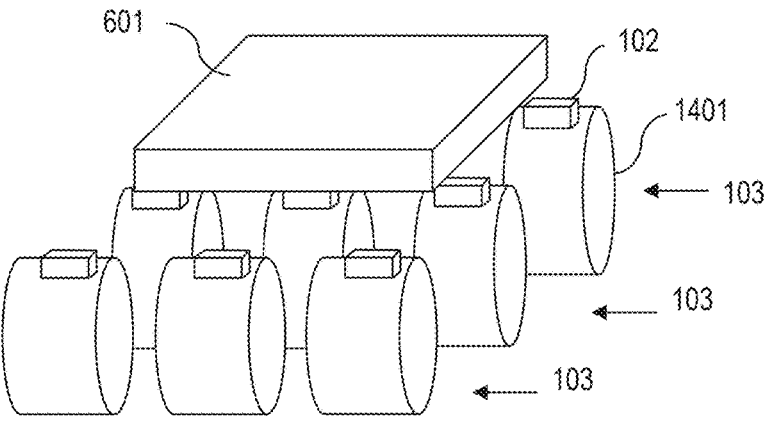
FIG. 14 illustrates an isometric front view of a grid of rotationally actuated permanent magnets levitating a configuration space unit above.

Referring to FIG. 14, an alternative actuator 103 is illustrated. A magnet 102 is mounted on a curved surface of a cylinder 1401 of the actuator 103. To lift the magnet 102 to its highest position, the cylinder 1401 is rotated on its axis so that the magnet 102 is on top of the cylinder 1401, and in its closest possible position to a configuration space unit 601 above. To lower the magnet 102, the cylinder 1401 is rotated on its axis so that the magnet 102 travels downward and away from a configuration space unit 601 above.

Furthermore, an additional means of adjusting the magnetic fields of permanent magnets acting on configuration space units to achieve stable levitation and motion is by using motors 1501 whereby the motor's rotating axis is mounted parallel to the horizontal plane representing the work surface.

Figure 15A:
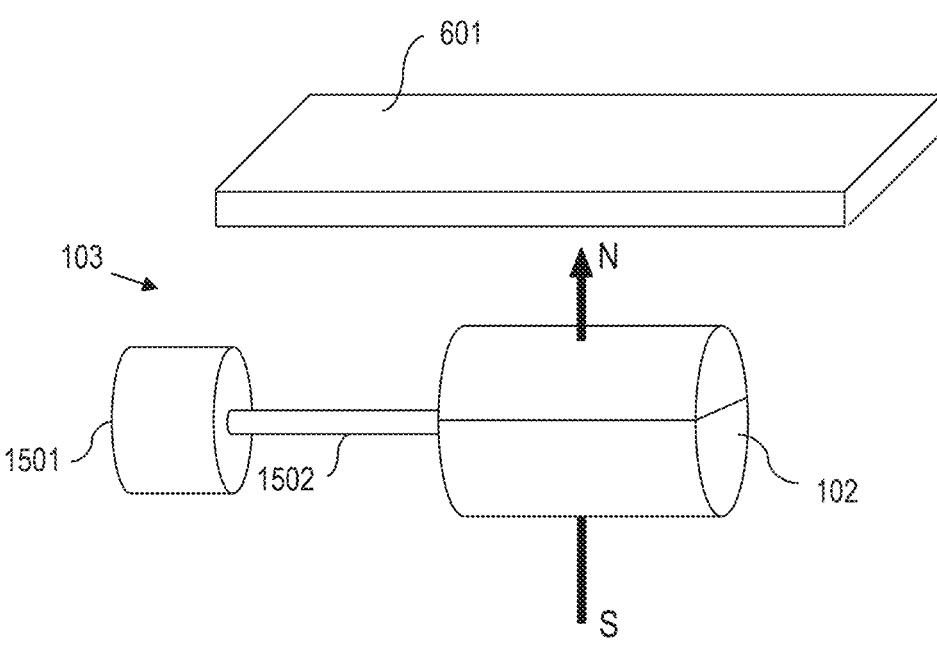
FIG. 15A illustrates an isometric side view of a rotationally actuated cylindrical permanent magnet.

Referring to FIG. 15A, another actuator 103 is illustrated with a configuration space unit 601 there above. The actuator 103 includes a motor 1501 and a shaft 1502. A magnet 102 (e.g., implemented as a cylinder) is mounted to the shaft 1502 along the motor's rotating axis such that the shaft 1502 and axis of rotation travel through the magnet's N/S transition (perpendicular to the magnetic pole) as in along the cylindrical axis of diametrically magnetized cylinders or disks.

Figure 15B:
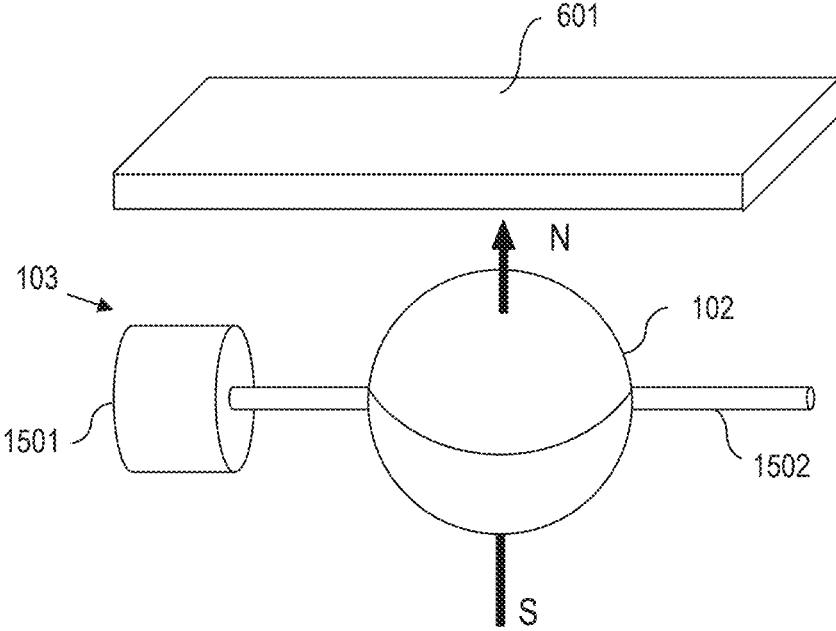
FIG. 15B illustrates an isometric side view of a rotationally actuated spherical permanent magnet.

Referring to FIG. 15B, another actuator 103 is illustrated with a configuration space unit 601 there above. The actuator 103 includes a motor 1501 and a shaft 1502. A magnet 102 (e.g., implemented as an axially magnetized sphere) is mounted to the shaft 1502 along the motor's rotating axis such that the shaft 1502 and axis of rotation travel through the magnet's N/S transition (perpendicular to the magnetic pole) or through the equator of an axially magnetized sphere. As the motor 1501 turns, its shaft 1502 turns the magnet's North or South Pole away from a levitation surface, thereby changing the magnetic forces (Fx, Fy, and Fz) acting with permanent magnets within the configuration space unit 601. A grid of unit cells each composed of so aligned motors with mounted permanent magnets positioned beneath a configuration space unit can achieve stable levitation and controlled motion of the configuration space unit through high frequency coordinated rotations of each motor's shaft to apply the needed dynamic force adjustments. In an example configuration, the diameter of the sphere, disc, or cylinder is slightly greater than that of the motor's diameter, so that peak magnetic field strength is felt at the levitation surface when the rotated magnet's magnetic field is perpendicular to the plane of the levitation surface. This approach to adjusting magnetic fields may be used in conjunction with electromagnets, or may be used as a standalone method of adjusting magnetic forces to achieve levitation.

Figure 16A:
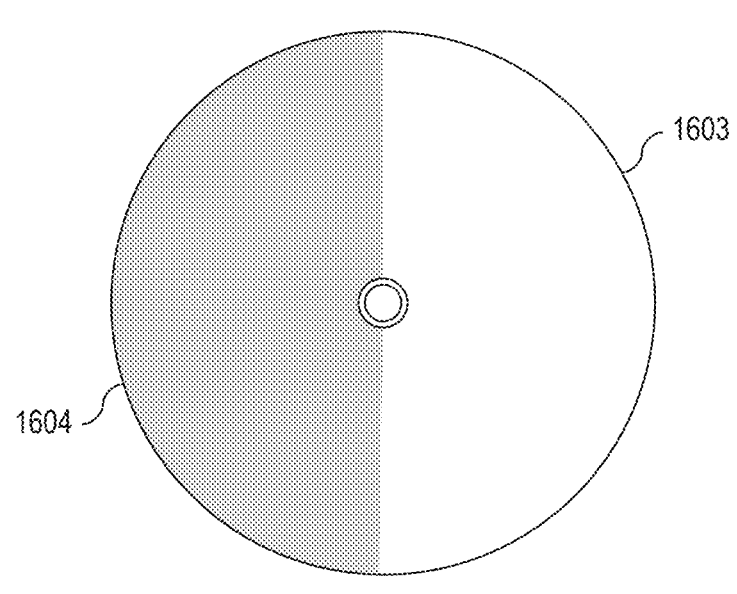
FIG. 16A illustrates a top view of a nonmagnetic disc with a half disc axially magnetized permanent magnet mounted on the nonmagnetic disc.
Figure 16B:
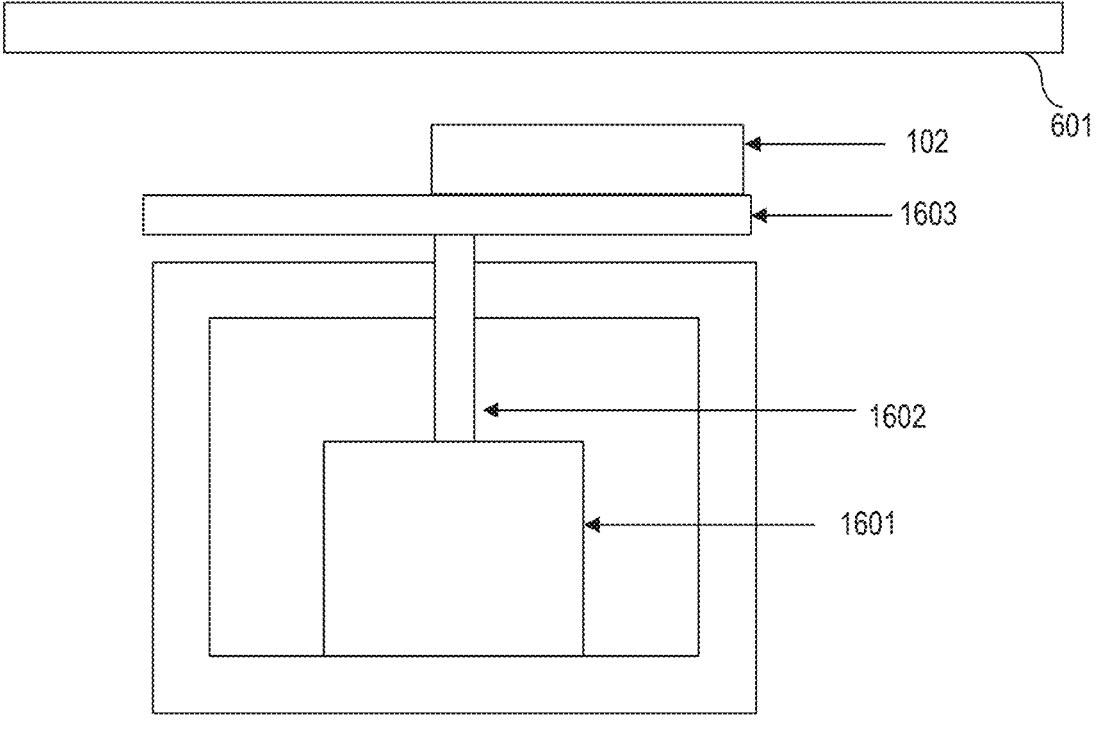
FIG. 16B illustrates a side view of the disc shown in FIG. 16A, mounted on a vertical shaft of a motor.

Referring to FIG. 16A and FIG. 16B generally, in an alternate configuration involving rotating magnets, each unit cell comprises of a motor 1601 with vertical shaft 1602, a preferentially non-magnetic disc 1603 connected to the shaft 1602 and used as a substrate, and a half-disc axially magnetized permanent magnet 102 is mounted on ½ of the non-magnetic disc substrate. Rotating the magnet 102 alters the magnetic forces which the half-disc magnet exerts on the magnets of a configuration space unit 601 above the work surface. The half-disc magnet 1604 can alternatively be a quarter-disc, or any partial disc shape which lacks full symmetry along the axis of rotation.

An additional approach for adjusting the magnetic fields of permanent magnets is by keeping the arrangement of permanent magnets fixed, and adding a separate arrangement of magnetically permeable material (i.e. any material with magnetic permeability that is not equal to 1) which can be dynamically reconfigured to alter the magnetic field of the bed of permanent magnets in the vicinity of a configuration space unit. The magnetically permeable material can be of any type such as iron, alloy steel, mu-metals or other diamagnetic or paramagnetic materials. Similar to the case of actuated permanent magnets, the magnetic field can be simulated for a given configuration of these permeable materials relative to fixed permanent magnets, and this configuration can be optimized such that the resulting magnetic field will exert a desired force on the levitated configuration space unit. The permeable materials can be attached to any type of mechanical motion system such as a linear actuator, motor, electroactive polymer etc. and this system of mechanically reconfigurable magnetically permeable materials can be used as a means of controlled magnetic levitation and/or movement.

Figure 17:
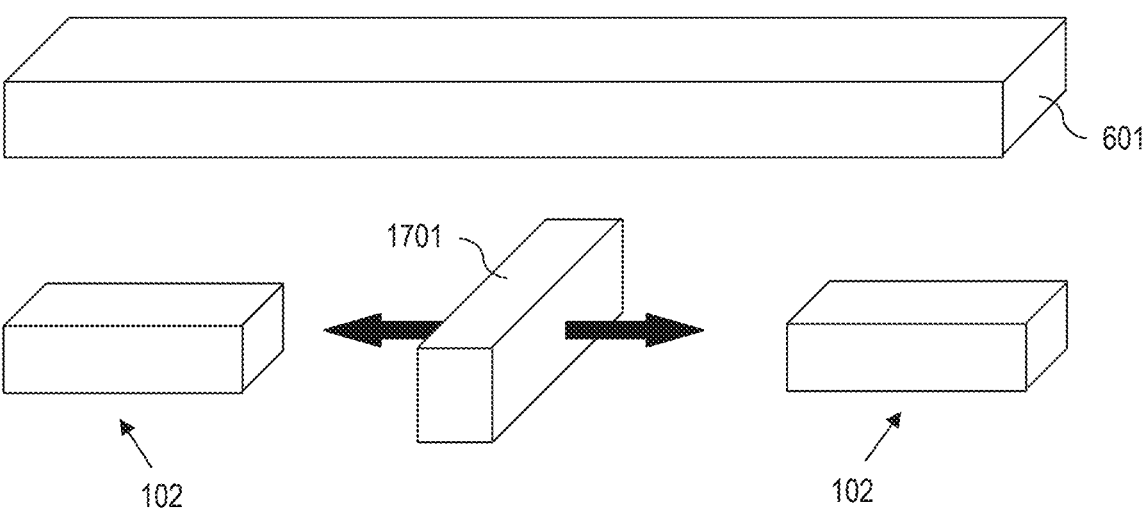
FIG. 17 illustrates an isometric side view of a piece of ferrous material being moved on the same level as and between two permanent magnets, to alter the forces that the magnets exert on a configuration space unit above.

Referring to FIG. 17, an example illustrates how non-actuated permanent magnets 102 can be used in conjunction with a laterally moveable piece of ferrous material to cause adjustable magnetic forces. In FIG. 17, the ferrous material 1701 is located on the same level as multiple permanent magnets 102. The ferrous material 1701 can move laterally amid and between the magnets 102, or be rotated, altering resulting magnetic forces which act on the magnets of a configuration space unit 601 above.

Figure 18:
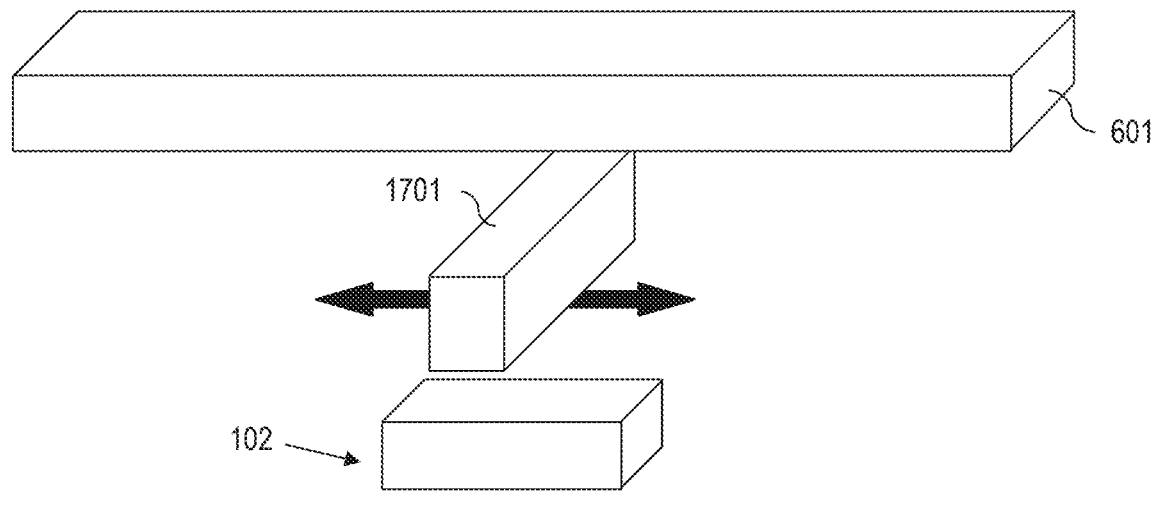
FIG. 18 illustrates an isometric side view of a piece of ferrous material being moved over a permanent magnet, to alter the force that the magnet exerts on a configuration space unit above.

FIG. 18 shows an alternate implementation, where a laterally moveable piece of ferrous material 1701 is located on a level above one or more permanent magnets 102, and below a levitated configuration space unit 601. By laterally or rotationally moving the ferrous material 1701 in relation to the permanent magnets 102 below, adjustable magnetic force is exerted on levitated magnets of the configuration space unit above.

Figure 19A:
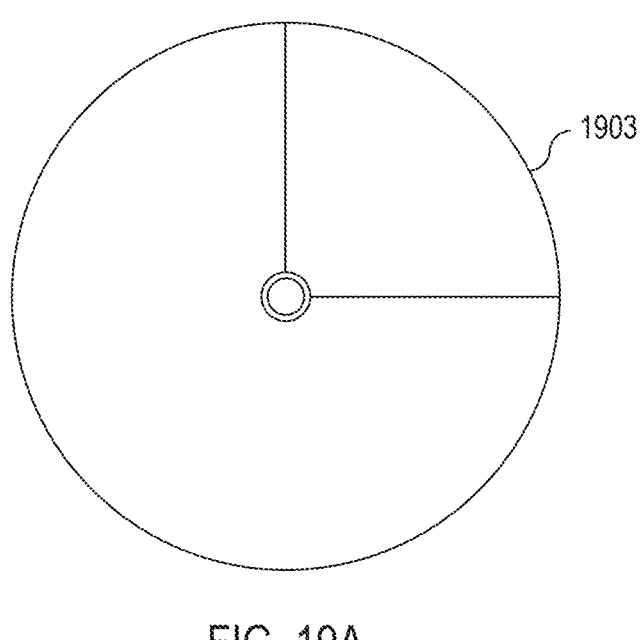
FIG. 19A illustrates a top view of a ¾ disc made of magnetically permeable material, with the remaining ¼ of the disc being made of nonmagnetic material, or being absent.
Figure 19B:
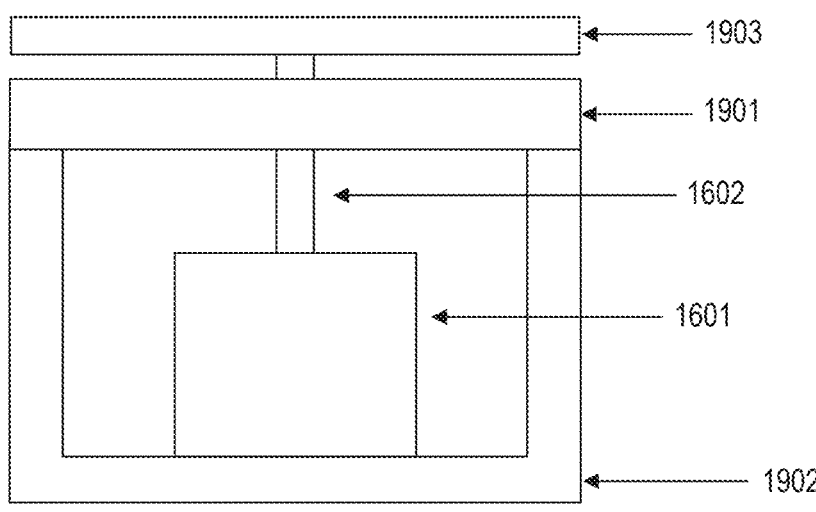
FIG. 19B illustrates a side view of the disc shown in FIG. 19A, mounted above a permanent magnet, on a vertical shaft of a motor.

Referring generally to FIGS. 19A and 19B, yet another example illustrates how non-actuated permanent magnets can be used in conjunction with rotatable discs of mu-metal or other magnetically permeable materials. FIG. 19B shows a unit cell including a non-actuated permanent magnet 1901 in the shape of a disc with a hole in the center, and mounted on a stationary frame 1902. A motor 1601 with a vertical shaft 1602 passes through the hole in the magnet 1901. A disc 1903 of which ¾ of its pie shape is made up of mu-metal, and the remaining ¼ of the pie shape is cut out, or made of non-magnetic material, as shown in FIG. 19A. Rotating the mu-metal partial disc 1903 alters the magnetic forces exerted by the permanent magnet 1901 below on the magnets of a levitated configuration space unit above. The mu-metal partial disc can have a shape which is any portion of a disk 1903, and it can have geometric cut-outs internally or along its perimeter. In a preferred implementation, the disk 1903 has a small thickness, allowing the permanent magnet 1901 below to be as close as possible to a configuration space unit above.

Referring to FIG. 20A and FIG. 20B generally, yet another example configuration illustrates a system of non-actuated permanent magnets used in conjunction with electromagnets, which may be utilized for instance, where rotation of the permanent magnet does not sufficiently reduce magnetic forces to the desired levels at the surface of the work surface, e.g., false floor. A movement system can be made up of modules (or tiles). Each module in this implementation has a bed of non-actuated permanent magnets and electromagnets residing beneath a work surface, e.g., false floor. The entire bed in the module can be moved up and down with actuators, raising the bed of magnets closer to the false floor and a configuration space unit in order to exert magnetic forces, and lowering the bed of magnets away, to remove the magnetic forces. In the implementation illustrated, the permanent magnets provide levitation forces, and the electromagnets can provide stability, movement forces, and can also provide levitation forces.

As shown in FIGS. 20A-B, the system includes a work surface 701. Under the work surface 701, lies a bed 2001, which supports electromagnetic coils 101 and permanent magnets 102. One or more actuators 103, e.g., linear actuators as illustrated, raise and lower the bed 2001. The electromagnetic coils 101 are coupled to the actuator(s) 103 and get lowered with the bed 2001. However, in some embodiments, the electromagnetic coils 101 can be coupled to or integral with the work surface 701, or otherwise decentralized from a unit cell, e.g., coupled to the work surface 701 or to a non-actuated portion of the unit cell. In this example, the electromagnetic coils 101 remain at a fixed position, even when the bed 2001 is lowered such that only the permanent magnets are lowered.

Alternatively, if rotating partial disc permanent magnets replace the stationary permanent magnets in the bed, then those permanent magnets can be used for stability and movement as well as levitation. Similarly, when unit cells of stationary permanent magnets with rotating magnetic permeable materials are substituted for the stationary permanent magnets in the bed, these unit cells can provide forces for levitation, stability and movement.

Aspects herein can incorporate a dense array of permanent magnets, and electromagnets in an array on a surface, e.g., above permanent magnets.

Referring to FIG. 21A-FIG. 21C generally, an array 2100 of non-actuated permanent magnets can be permanently affixed to a surface in a regular grid pattern, with arrays of magnets consisting of multiple columns and multiple rows of magnets one magnet wide with the spacing between magnets in array columns being one magnet's width and the spacing between magnets in array rows also being one magnet's width. In this configuration, electromagnets, such as an electromagnet printed onto a PCB, are interspersed in the gaps between the permanent magnets, creating an offset array of electromagnets. In this implementation, the permanent magnets provide the primary repulsive levitation forces, while the electromagnets provide the high speed dynamic force adjustments needed to achieve stable levitation, and the dynamic forces needed to push or pull a configuration space unit with an array of embedded permanent magnets from one location to the next over the bed of fixed permanent magnets and electromagnets. A false floor can rest over the bed of fixed permanent magnets and electromagnets, providing protection to the magnetic movement system. In this configuration, the permanent magnets are non-actuated and therefore cannot be retracted from the false floor.

Three example configurations illustrated in FIG. 21A, FIG. 21B and FIG. 21C show some possible permanent magnet and electromagnet configurations, with squares representing permanent magnets and hexagons representing electromagnets. In related implementations, the spacing between permanent magnets in rows and columns can be different, and the spacing distance can be more or less than one magnet's width. Furthermore, the electromagnet array can have a higher or lower density than the permanent magnet array.

Example Electromagnetic Coil and/or Magnet Configurations

Referring to FIG. 22A-FIG. 22H generally, several example unit cells 100 are illustrated. The unit cells are illustrated by way of example of the flexibility of the hybrid system, and are not intended to be illustrated by way of limitation. The illustrated examples can by used with any combination of features described with regard to the preceding FIGURES unless otherwise stated.

FIG. 22A illustrates a unit cell 100 where an actuator 103 includes an arm 110 and a plate 112 situated at a distal end of the arm 110. Multiple permanent magnets 102 are coupled to the plate 112. In this regard, the plate 112 is illustrated as being generally rectangular. However, the plate 112 can take any shape. Moreover, as noted more fully herein, each permanent magnet 102 can be the same size or a different size, same magnetic strength or have a different magnetic strength, have the same height or different height, etc. Regardless, in the example of FIG. 22A, a single electromagnetic coil 101 surrounds the plate 112.

FIG. 22B illustrates another example unit cell 100 analogous to that of FIG. 22A, thus the disclosure of FIG. 22A is incorporated unless otherwise noted. In FIG. 22B, the unit cell has an actuator 103 that includes an arm 110 and a plate 112 situated at a distal end of the arm 110. Multiple permanent magnets 102 are coupled to the plate 112 analogous to that of FIG. 22A. However, instead of an electromagnetic coil 101 surrounding the plate 112, an electromagnetic coil, e.g., implemented on a PCB is situated over the plate 112.

FIG. 22C illustrates another example unit cell 100 analogous to that of FIG. 22A, thus the disclosure of FIG. 22A is incorporated unless otherwise noted. In FIG. 22C, the unit cell has an actuator 103 that includes an arm 110 and a plate 112 situated at a distal end of the arm 110. Multiple permanent magnets 102 are coupled to the plate 112 analogous to that of FIG. 22A. However, FIG. 22C incorporates a plurality of electromagnetic coils, e.g., a coil associated with each permanent magnet 102. In some implementations, each electromagnetic coil 101 aligns e.g., coaxially with a corresponding permanent magnet 102. However, there is no strict 1 to 1 requirement of electromagnetic coil 101 to permanent magnet 102. Moreover, the size, wire, winds, resistance, dimensions, electrical properties, magnetic properties, etc., of each electromagnetic coil 101 can be the same or different.

FIG. 22D illustrates another example unit cell 100 analogous to that of FIG. 22C, thus the disclosure of FIG. 22A and FIG. 22C are incorporated unless otherwise noted. In FIG. 22D, the unit cell has an actuator 103 that includes an arm 110 and a plate 112 situated at a distal end of the arm 110. Multiple permanent magnets 102 are coupled to the plate 112 analogous to that of FIG. 22A. However, FIG. 22D incorporates a plurality of electromagnetic coils. However, unlike FIG. 22C, in FIG. 22D, one or more electromagnetic coils 101 is offset from a corresponding permanent magnet 102.

Figure 22E:
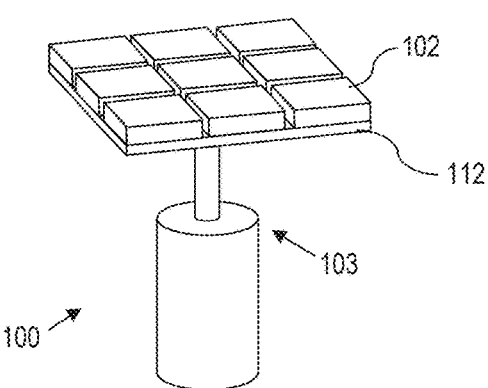
FIG. 22E illustrates a further example unit cell having an n×m array of multiple permanent magnets arranged on a plate where n and m can each be any positive whole number, which can also be the same or different.

FIG. 22E illustrates another example unit cell 100 analogous to that of FIG. 22A, thus the disclosure of FIG. 22A is incorporated unless otherwise noted. In FIG. 22E, the unit cell has an actuator 103 that includes an arm 110 and a plate 112 situated at a distal end of the arm 110. Multiple permanent magnets 102 are coupled to the plate 112 analogous to that of FIG. 22A. However, in FIG. 22E, there is no electromagnetic coil 101. Moreover, the permanent magnets 102 are arranged on the plate 112 in an n×m array, e.g., a 3×3 array as illustrated. However, n and m can be any reasonable non-negative whole number.

Figure 22F:
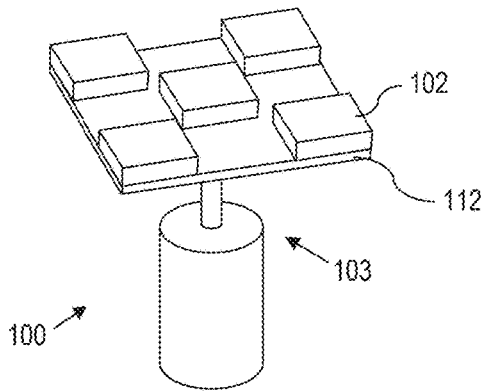
FIG. 22F illustrates yet another example unit cell having multiple permanent magnets arranged on a plate in a spaced pattern.

FIG. 22F illustrates another example unit cell 100 analogous to that of FIG. 22A, thus the disclosure of FIG. 22A is incorporated unless otherwise noted. In FIG. 22F, the unit cell has an actuator 103 that includes an arm 110 and a plate 112 situated at a distal end of the arm 110. Multiple permanent magnets 102 are coupled to the plate 112 analogous to that of FIG. 22A. However, in FIG. 22F, there is no electromagnetic coil 101. Moreover, the permanent magnets 102 are arranged on the plate 112 in a spread out manner, which may or may not form a pattern. Regardless, there are open spaces between permanent magnets 102 (e.g., as illustrated, there is a permanent magnet 102 in each corner of the plate 112, and a permanent magnet 102 at the center of the plate 112). In some embodiments, the open spaces between the permanent magnets may instead include an electromagnet coil coupled to the false floor or a non-actuated portion of the plate.

Figure 22G:
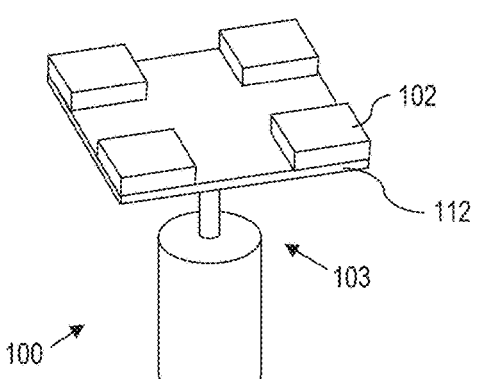
FIG. 22G illustrates still a further example unit cell having multiple permanent magnets arranged on a plate where a permanent magnet is in each corner of the plate.

FIG. 22G illustrates another example unit cell 100 analogous to that of FIG. 22A, thus the disclosure of FIG. 22A is incorporated unless otherwise noted. In FIG. 22G, the unit cell has an actuator 103 that includes an arm 110 and a plate 112 situated at a distal end of the arm 110. Multiple permanent magnets 102 are coupled to the plate 112 analogous to that of FIG. 22A. However, in FIG. 22G, there is no electromagnetic coil 101. Moreover, the permanent magnets 102 are arranged on the plate 112 in a spread out manner, which may or may not form a pattern. Regardless, there are open spaces between permanent magnets 102 (e.g., as illustrated, there is a permanent magnet 102 in each corner of the plate 112).

Figure 22H:
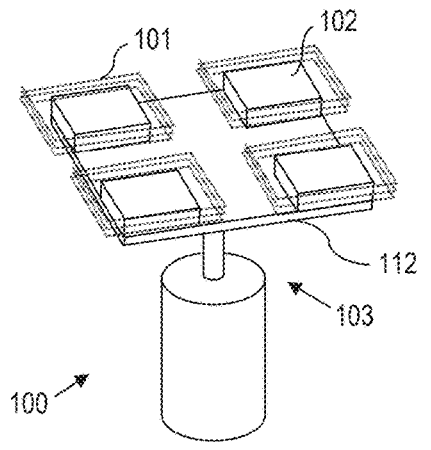
FIG. 22H illustrates another example unit cell having a permanent magnet and corresponding electromagnetic coil in each corner of a plate.

FIG. 22H illustrates another example unit cell 100 analogous to that of FIG. 22A, thus the disclosure of FIG. 22A is incorporated unless otherwise noted. In FIG. 22F, the unit cell has an actuator 103 that includes an arm 110 and a plate 112 situated at a distal end of the arm 110. Multiple permanent magnets 102 are coupled to the plate 112 analogous to that of FIG. 22A. However, the permanent magnets 102 are arranged on the plate 112 in a spread out manner, which may or may not form a pattern. Regardless, there are open spaces between permanent magnets 102 (e.g., as illustrated, there is a permanent magnet 102 in each corner of the plate 112. Additionally, there is an electromagnetic coil 101 over each permanent magnet 102 such that as the actuator 103 moves the plate 112 up and down, the permanent magnets 102 each move through (at least partially) a corresponding electromagnetic coil 101.

Figure 22I:
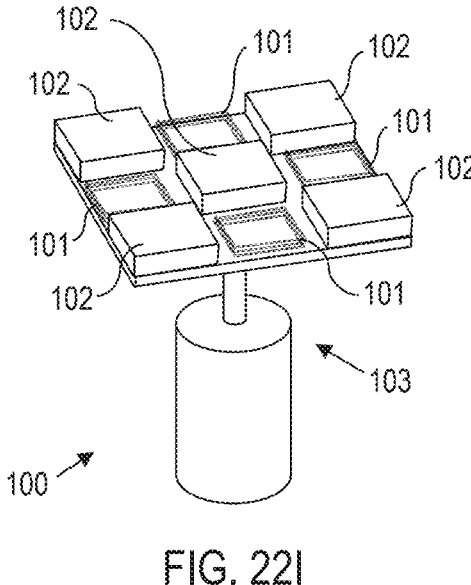
FIG. 22I illustrates still another example unit cell having multiple permanent magnets arranged on a plate in a spaced pattern, with at least one electromagnetic coil in each space between the permanent magnets.
Figure 22J:
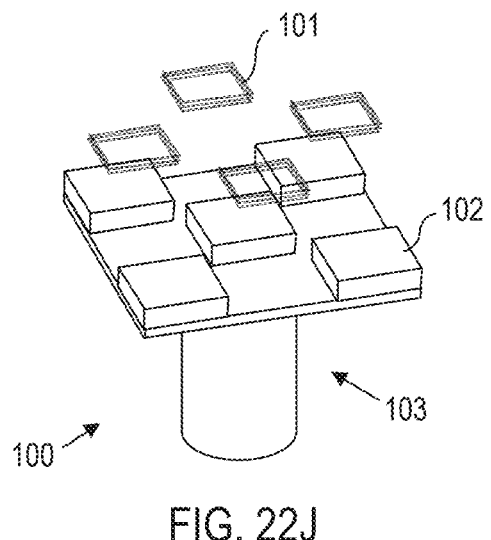
FIG. 22J illustrates an example of the unit cell of FIG. 22I, where the electromagnetic coils are fixedly positioned, and the permanent magnets can move relative to the electromagnetic coils via an actuator.

Referring to FIG. 22I and FIG. 22J, a unit cell 100 can include electromagnetic coils 101, magnets 102, and an actuator 103. In this example, the magnets 102 are arranged in a pattern, such as a checkerboard pattern. Electromagnetic coils 101 are provided in the spaces of the "checkerboard", where the magnets 102 leave spaces. Thus, the electromagnetic coils 101 and magnets 102 do not overlap in the Z-direction. FIG. 22I illustrates an example where an arm of the actuator 103 is extended so that the electromagnetic coils 101 and the magnets 102 are generally in the same X-Y plane. Correspondingly, FIG. 22J illustrates an example where the electromagnetic coils 101 are in a fixed position, and the magnets 102 reciprocate with movement of the actuator 103. In FIG. 22J, the actuator 103 is in a retracted position where the electromagnetic coils 101 and magnets 102 do not overlap in the Z-direction, nor do they align in an X-Y plane. In other implementations, the electromagnetic coils 101 can couple to the actuator 103 so as to move with the magnets 102.

Figure 22K:
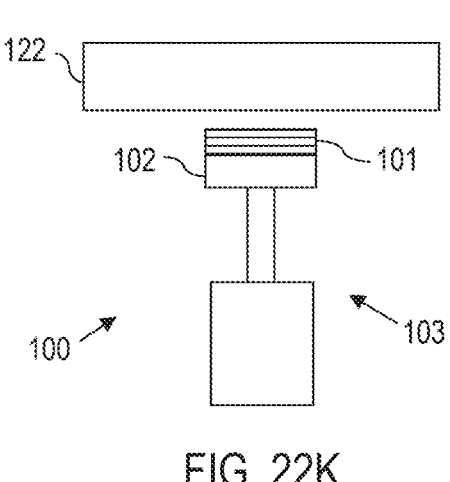
FIG. 22K illustrates an example unit cell where at least one magnet, e.g., permanent magnet, is coupled to an actuator. An electromagnetic coil can be fixedly positioned under a work surface, or the electromagnetic coil can be coupled to the actuator.

Referring to FIG. 22K, a unit cell 100 includes an electromagnetic coil 101, a magnet 102, and an actuator 103 positioned below a work surface 122. Here, the actuator 103 can raise and lower at least the magnet 102, but only to the bottom of the work surface.

Figure 22L:
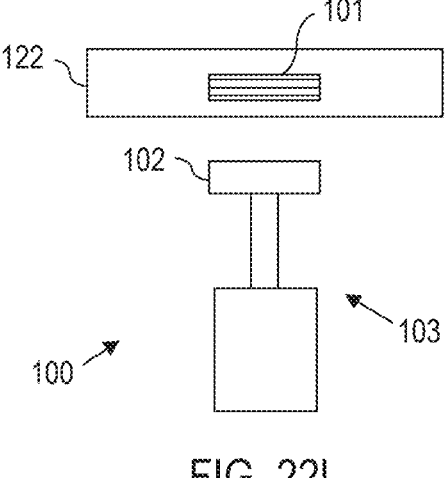
FIG. 22L illustrates an example unit cell where at least one magnet is coupled to an actuator, and an electromagnetic coil is provided within, on or otherwise integrated with a work surface so as to be separate from the unit cell.

Referring to FIG. 22L, by comparison to FIG. 22K, the illustrated example includes an electromagnetic coil 101, a magnet 102, and an actuator. Here, the magnet 102 and actuator 103 are positioned below a work surface 122. However, the electromagnetic coil 101 is decoupled from the unit cell 100. For instance, the electromagnetic coil 101 can be positioned above, below, or within the worksurface 122.

MISCELLANEOUS

With reference to the FIGURES generally, and the disclosure herein, aspects herein provide a system that can be made modular.

For instance, in example implementations, the work surface, magnetic systems, controllers, support hardware, software, or combinations thereof can be modular, allowing dynamic scalability, adjustment, reconfiguration, etc., of the work surface itself, or of the included configurations therein (e.g., unit cells, electromagnets, permanent magnets, controllers, cooling systems, beds, tiles, platforms, etc.). Such can promote flexibility for repair, upgrade, reconfiguration, etc.

For instance, various combinations of unit cells, work surfaces, etc., can be arranged in any order, grouping, density, etc. Arrays of unit cells and/or work surfaces can be formed into intermediate sections that can be combined in any order or combination. In this regard, work surfaces, e.g., work surface 701 can be made modular so that systems can be scalable, reconfigurable, adaptable, etc. This allows different sections to include different densities, strengths, sizes, etc. as the specific application dictates. This also allows systems to be configured as housed configurations that can be installed and assembled into existing locations, including over existing floors.

As another example, a system can be provided as a modular configuration, e.g., implemented as a sensing floor module (SFM), that includes actuated magnets therein (e.g., via unit cells). The system can also optionally include a false floor on top such that the modular configuration can be installed on an existing floor as tiles that are hooked, snapped, locked or otherwise joined to each other so that they all work together as one floor.

That is, the features herein, can be integrated with any components of any disclosure incorporated by reference herein.

As noted more fully herein, a controller 104 can be provided. Here, controllers can function to control a module, group of modules, serve as a supervisory controller over a set of sub controllers, etc. That is, a controller can be provided for a single unit cell 100 up to any combination of unit cells, whether configured the same or different, in the same module, or otherwise.

Moreover, aspects herein include the ability to scale systems from multiple unit cells, beds, modules, tiles, or other configurations, down to a single unit cell. That is, a single unit cell 100, e.g., as illustrated in any combination of FIGS. 1A-3 can be implemented as an entire system.

In some configurations, Halbach arrays can be integrated, for example, in a configuration space unit and/or as an actuated magnet in a unit cell configuration. For instance, a Halbach array can be provided in addition to, or in lieu of a permanent magnet to implement the magnet 602, FIG. 6. Also, a Halbach array can be provided in addition to, or in lieu of a permanent magnet to implement the magnet 102, FIG. 1A-FIG. 1C, by way of example.

In some example configurations, a movement system can spin Halbach array in unit cells within a corresponding work surface, creating eddy currents in the work surface.

Moreover, some configurations can use the same motor to cause a Halbach array to spin, and to raise and lower the Halbach array. In this regard, a switching mechanism changes motion from vertical actuation to rotational spinning of arrays.

Some configurations utilize rotating magnets to change magnetic fields. Rotating magnets can also be combined with movements, e.g., vertical actuations, linear or rotational movements, etc., so that magnetic fields can be removed from the surface of floor. As such, actuations can be linear (e.g., vertical, rotational, or both in combination).

Some configurations can utilize actuated permanent magnets to both generate permanent magnetic forces, and to generate a changing magnetic field to induce currents and therefore magnetic forces within the coils.

Some aspects herein spin permanent magnets in a unit cell to create magnetic forces in outer/upper coils to provide both a constant field and a fast changing field. Aspects herein can incorporate rectifying circuits to provide DC current flow, so that the movement system can control a direction and timing of current flows to generate controlled induced magnetic fields.

In some configurations, a configuration avoids positioning floor magnets in unit cells on a same grid as that of configuration space unit magnets, which can be helpful to avoid 'dead' zones.

In some configurations, a system comprises electromagnetic coils within the floor, and wheeled configuration space units.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various implementations with various modifications as are suited to the particular use contemplated.

What is claimed is:

1. A system comprising:
a work surface having a configuration space associated therewith;
a configuration space unit, the configuration space unit positionable within the associated configuration space of the work surface; and
a magnetic movement system having unit cells arranged in cooperation with the work surface, each unit cell comprising:
an actuator;
a magnet coupled to the actuator such that the actuator causes movement of the magnet defining an actuated magnet; and
an electromagnetic coil;
wherein the magnetic movement system is configured such that a magnetic field produced by at least one unit cell performs at least one operation that affects a position of the configuration space unit within the configuration space of the work surface.

2. The system of claim 1 further comprising:
a controller operatively programmed to control the unit cells of the magnetic movement system to perform the at least one operation to levitate, tilt, spin/orient, move, propel, thrust, pull, push, or combinations thereof, the configuration space unit relative to the work surface, wherein the controller is programmed to carry out each operation based issuing commands to at least one unit cell to:
selectively control the actuator to adjust a position of the actuated magnet relative to the work surface;
selectively communicate a signal to the electromagnetic coil to control a field generated thereby; or
selectively control both the actuator and the communicated signal to the electromagnetic coil.

3. The system of claim 2, wherein:
each unit cell of the magnetic movement system further comprises a sensor node that is configured to measure at least one kinematical aspect of the configuration space unit; and
the controller is further operatively programmed to:
collect measurements from at least one sensor node;
detect an instability of the configuration space unit based at least in part, from the collected measurements; and
provide a command to the magnetic movement system to output a time-varying magnetic field which reacts to the detected instability based upon the collected measurements to provide a magnetic field which counters the instability.

4. The system of claim 3, wherein:
at least one sensor node measures position, velocity, acceleration, or a combination thereof.

5. The system of claim 3, wherein:
at least one sensor node measures position; and
the controller:
detects the instability based upon a sensed position determined from the collected measurements;

determines the configuration space unit to be drifting from a desired position; and
provides the command to the magnetic movement system to apply a countering force to the magnet of the levitated configuration space unit.

6. The system of claim 2, wherein:
the controller is operatively programmed to control at least one unit cell such that:
the controller operates the electromagnetic coil at a first frequency; and
the controller operates the actuator at a second frequency;
where the first frequency is greater than the second frequency.

7. The system of claim 2, wherein:
the controller is operatively programmed to control at least one unit cell such that:
the controller operates the actuator and hence, the actuated magnet in the Z direction to control a magnetic force applied to the configuration space unit; and
the controller controls the electromagnetic coil to control X and Y direction forces, and θx, θy and θz torques to control stability of the configuration space unit.

8. The system of claim 2, wherein:
the controller is operatively programmed to control at least one unit cell such that:
the controller operates the actuator and hence, the actuated magnet in the Z direction to control a magnetic force applied to the configuration space unit; and
the controller controls at least one of the actuator and the electromagnetic coil to control X and Y direction forces, and θx, θy and θz torques to control stability of the configuration space unit.

9. The system of claim 2, wherein:
the controller is operatively programmed to control at least one unit cell such that:
the actuated magnet of at least one unit cell provides levitation forces (Z forces) of the configuration space unit, whereas the electromagnetic coil provide high frequency lateral force adjustments (X and Y) needed to maintain levitation and keep the levitated configuration space unit on a desired path.

10. The system of claim 1, wherein for at least one unit cell:
the electromagnetic coil is situated in line with movement of the actuated magnet via the actuator; and
a controller is operatively programmed to selectively operate the actuator to facilitate a magnetic force applied to the configuration space unit, and to selectively modify properties of the electromagnetic coil to affect the stability of the configuration space unit.

11. The system of claim 1, wherein for at least one unit cell:
the electromagnetic coil is on a printed circuit board, which is coupled to a select one of the actuated magnet or a moveable component of the actuator.

12. The system of claim 11, wherein:
the electromagnetic coil on the printed circuit board comprises a coil that is part of a set of electromagnetic coils.

13. The system of claim 1, wherein for at least one unit cell:
the actuated magnet is moveable by the associated actuator relative to the work surface; and the electromagnetic coil is stationary relative to the work surface.

14. The system of claim 1, wherein for at least one unit cell:

the actuated magnet and the electromagnetic coil are both moveable by the associated actuator relative to the work surface.

15. The system of claim 1, wherein for at least one unit cell:

the magnet is part of a set of magnets arranged in a first pattern; and the electromagnetic coil is part of a set of electromagnetic coils arranged in a second pattern different from the first pattern.

16. The system of claim 1 further comprising a cryogenic cooling system to cool the electromagnetic coil.

17. The system of claim 1, wherein the configuration space unit is implemented as a conveyance system that includes at least one of wheels, rollers, casters, or bearings, so that complete levitation is not strictly required to effect movement of the conveyance system within the configuration space by the magnetic movement system.

18. The system of claim 17, wherein a weight of a load on the conveyance system is carried in a manner that is split between an assist provided by the magnetic movement system and the conveyance system.

19. The system of claim 1, wherein:

the actuated magnet of each unit cell is varied in at least one of default height or magnetic strength.

20. The system of claim 1, wherein:

at least one actuator comprises a select one of:

a linear actuator;

an actuator that affects rotating the corresponding permanent magnet on a cylinder or disc; or an actuator that selectively covers and uncovers the corresponding permanent magnet with a magnetically permeable material.

21. The system of claim 1, wherein:

the configuration space unit comprises a magnet;

the actuated magnet and/or the electromagnetic coil of at least one unit cell generates a magnetic field that interacts with the magnet of the configuration space unit to carry out each operation.

22. A system comprising:

a configuration space unit;

a magnetic movement system that is configured to perform at least one operation to levitate, tilt, spin/orient, move, propel, thrust, pull, or push the configuration space unit, the magnetic movement system having unit cells, each unit cell comprising:

an actuator;

a magnet coupled to the actuator such that the actuator causes movement of the magnet; and an electromagnetic coil;

a controller operatively programmed to control the unit cells of the magnetic movement system to perform the at least one operation, wherein the controller is programmed to carry out each operation based issuing commands to at least one unit cell to:

selectively control the actuator to adjust a position of the actuated magnet relative to the work surface;

selectively communicate a signal to the electromagnetic coil to control a field generated thereby; or selectively control both the actuator and the communicated signal to the electromagnetic coil.

23. A system comprising:

a configuration space unit having a magnet and a conveyance system on a bottom thereof;

a magnetic movement system that is configured to utilize magnetic forces in cooperation with the magnet on the bottom of the configuration space unit to move the configuration space unit across a floor, the magnetic movement system having unit cells that cooperate with the floor, each unit cell comprising:

at least one of:

an actuator; and a permanent magnet coupled to the actuator such that the actuator causes movement of the permanent magnet; and an electromagnetic coil;

a controller that is communicably coupled to unit cells, wherein the controller is operatively programmed to control select unit cells to carry out the movement of the configuration space unit across the floor.

24. The system of claim 23, wherein:

the conveyance system does not touch the floor when being levitated.

25. The system of claim 23, wherein:

the configuration space unit further comprises bumpers along the bottom edges thereof, that may touch the work surface as a configuration space unit starts to tilt beyond a certain $\theta x$ or $\theta y$ angle.

* * * * *